US011623266B2

(12) United States Patent
Morita et al.

(10) Patent No.: US 11,623,266 B2
(45) Date of Patent: Apr. 11, 2023

(54) SHEET MATERIAL MACHINING SYSTEM AND METHOD FOR PROCESSING WORKPIECE

(71) Applicant: Yamazaki Mazak Corporation, Niwa-gun (JP)

(72) Inventors: Yukio Morita, Niwa-gun (JP); Isao Kuwayama, Niwa-gun (JP); Tetsu Hattori, Niwa-gun (JP); Yoshihiko Sakai, Niwa-gun (JP); Yoshihiro Nakamura, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 866 days.

(21) Appl. No.: 16/509,499

(22) Filed: Jul. 12, 2019

(65) Prior Publication Data
US 2019/0337041 A1 Nov. 7, 2019

Related U.S. Application Data

(63) Continuation of application No. PCT/JP2017/006871, filed on Feb. 23, 2017.

(51) Int. Cl.
*B21D 43/28* (2006.01)
*B07C 5/36* (2006.01)
(Continued)

(52) U.S. Cl.
CPC ............ *B21D 43/287* (2013.01); *B07C 5/362* (2013.01); *B21D 43/18* (2013.01); *B21D 45/00* (2013.01); *B23Q 7/12* (2013.01); *B26D 7/1863* (2013.01)

(58) Field of Classification Search
CPC ...... B07C 5/362; B21D 43/18; B21D 43/287; B21D 45/00
See application file for complete search history.

(56) References Cited

U.S. PATENT DOCUMENTS

| 2005/0167240 A1* | 8/2005 | Veit | ........................ | B07C 5/362 |
| | | | | 198/370.02 |
| 2021/0001504 A1* | 1/2021 | Wade | ..................... | B26D 7/018 |
| 2021/0114207 A1* | 4/2021 | Ottnad | ..................... | B25J 13/08 |

FOREIGN PATENT DOCUMENTS

| CN | 105034070 | 11/2015 |
| CN | 204818928 U | 12/2015 |
| | (Continued) | |

OTHER PUBLICATIONS

European Office Action for corresponding EP Application Application No. 17895501.9-1016, dated Nov. 18, 2020.
(Continued)

Primary Examiner — Michael McCullough
Assistant Examiner — Kalyanavenkateshware Kumar
(74) Attorney, Agent, or Firm — Mori & Ward, LLP

(57) ABSTRACT

A sheet material machining system includes a sheet material machining machine which is configured to machine a workpiece to produce a machined workpiece that includes a plurality of products and a residual material. The machined workpiece is configured to be placed on a sorting table. The plurality of products are configured to be placed on a temporary placement table. At least one product among the plurality of products are configured to be placed on a discharge table. A carrier includes an attracting actuator and a mobile actuator. The order management processor is configured to control the carrier and includes a storage configured to memorize a layout of the plurality of products in the workpiece. The plurality of products are associated with an attracting order.

17 Claims, 18 Drawing Sheets

(51) Int. Cl.
      *B21D 43/18*      (2006.01)
      *B21D 45/00*      (2006.01)
      *B23Q 7/12*      (2006.01)
      *B26D 7/18*      (2006.01)

(56) References Cited

FOREIGN PATENT DOCUMENTS

| | | |
|---|---|---|
| JP | 05-111782 | 5/1993 |
| JP | 2001-139146 | 5/2001 |
| JP | 2001-179373 | 7/2001 |
| JP | 2006-26874 | 2/2006 |
| JP | 2015-104793 | 6/2015 |

OTHER PUBLICATIONS

European Office Action for corresponding EP Application No. 17 895 501.9- 016, dated Jun. 17, 2020.
International Search Report for corresponding International Application No. PCT/JP2017/006871, dated May 16, 2017.
Written Opinion for corresponding International Application No. PCT/JP2017/006871, dated May 16, 2017.
Japanese Office Action for corresponding JP Application No. 2017-535458, dated Aug. 1, 2016 (w/ English machine translation).
Chinese Office Action for corresponding CN Application No. 201780014905.6, dated Jan. 3, 2019.
Extended European Search Report for corresponding EP Application No. 17895501 9-1016, dated Mar. 21, 2019.

\* cited by examiner

SHEET MATERIAL MACHINING SYSTEM AND METHOD FOR PROCESSING WORKPIECE

CROSS-REFERENCE TO RELATED APPLICATIONS

The present application is a continuation application of International Application No. PCT/JP2017/006871, filed Feb. 23, 2017. The contents of this application are incorporated herein by reference in their entirety.

BACKGROUND OF THE INVENTION

Field of the Invention

The present invention relates to a sheet material machining system and a method for processing a workpiece.

Discussion of the Background

A sheet material machining system is known that cuts out a product from a sheet material and conveys the cut-out product.

Japanese Unexamined Patent Application Publication No. 2001-179373 describes a sheet material carriage system. The sheet material carriage system includes a sheet material machining machine, a product carriage, and a loader. The product carriage separates and puts in place sheet material products. The loader unloads the sheet material products one by one from the sheet material machining machine to the product carriage. The sheet material carriage system further includes a temporary placement table placed between the sheet material machining machine and the product carriage. The sheet material carriage system causes the loader to unload a sheet material product on the temporary placement table to the product carriage, while the sheet material machining machine is performing machining on a next sheet material.

SUMMARY OF THE INVENTION

According to one aspect of the present invention, a sheet material machining system includes a sheet material machining machine, a sorting table, a temporary placement table, a discharge table, a carrier, and an order management processor. The sheet material machining machine is configured to machine a workpiece to produce a machined workpiece that includes a plurality of products and a residual material. The machined workpiece is configured to be placed on the sorting table. The plurality of products are configured to be placed on the temporary placement table. At least one product among the plurality of products are configured to be placed on the discharge table. The carrier includes an attracting actuator having a plurality of attracting portions; and a mobile actuator to move the attracting actuator between the sorting table and the temporary placement table, and between the temporary placement table and the discharge table. The order management processor is configured to control the carrier and includes a storage configured to memorize a layout of the plurality of products in the workpiece. The plurality of products are associated with an attracting order.

According to another aspect of the present invention, a method for processing a workpiece includes controlling a sheet material machining machine to machine a workpiece so as to produce a machined workpiece which includes a plurality of products and a residual material in accordance with a layout of the plurality of products in the workpiece memorized in a storage device. The plurality of products are associated with an attracting order. A carrier is controlled to convey the machined workpiece from the sheet material machining machine to a sorting table. The carrier is controlled to convey, in accordance with the layout memorized in the storage device, the plurality of products from the sorting table to a temporary placement table leaving the residual material on the sorting table. An attracting actuator of the carrier is controlled to attract, in accordance with the attracting order, at least one product among the plurality of products placed on the temporary placement table. The carrier is controlled to convey the at least one product attracted by the attracting actuator from the temporary placement table to a discharge table. The attracting actuator is controlled to release the at least one product above the discharge table to place the at least one product on the discharge table.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Sheet material machining systems and operation methods for the sheet material machining systems according to some embodiments will now be described herein with reference to the drawings. It is to be noted that, in the following embodiments, like numerals designate identical or corresponding components having identical functionality throughout the drawings. Such components will not be repeatedly elaborated upon here.

First Embodiment

Figure 1:
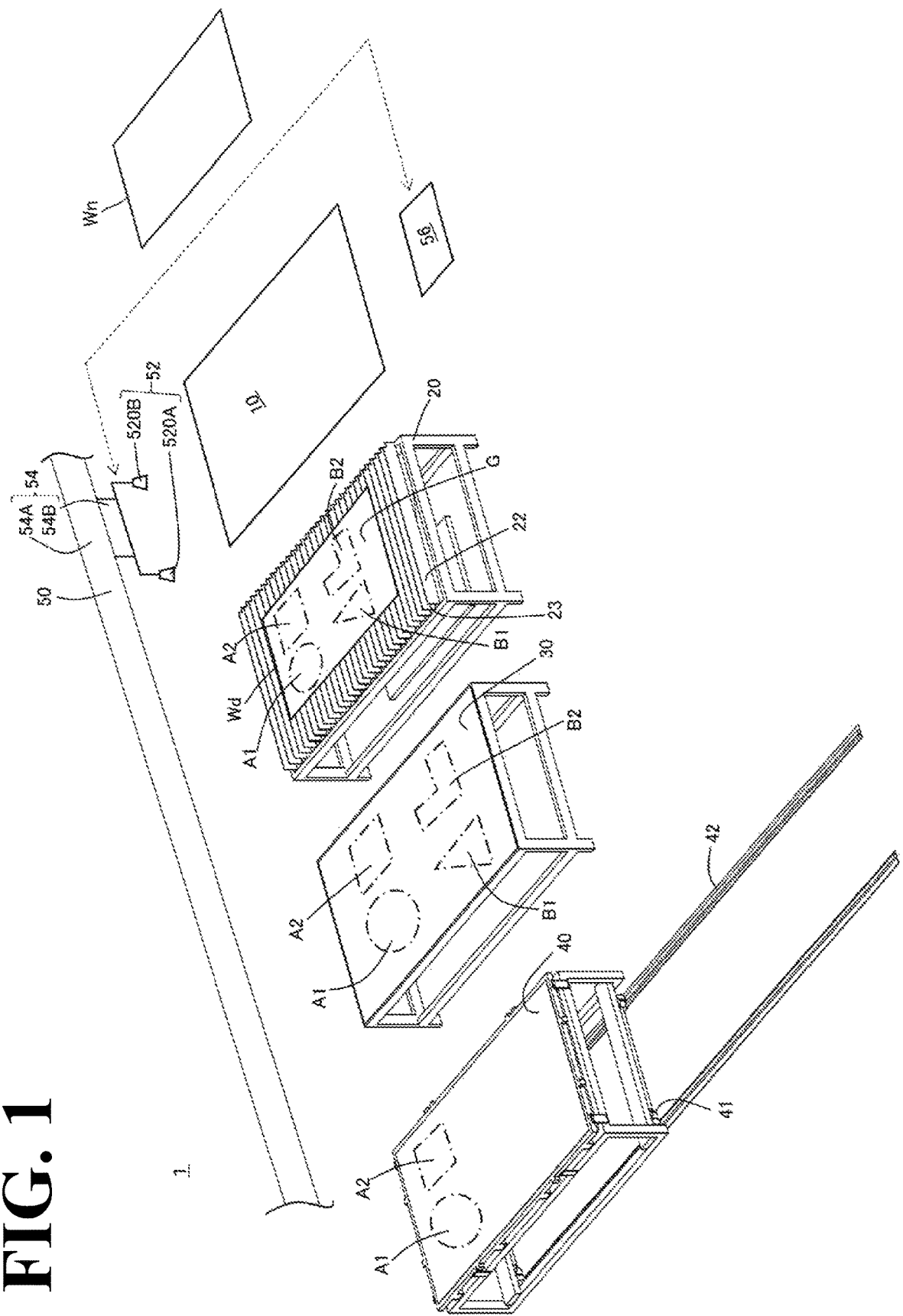
FIG. 1 is a view of a sheet material machining system according to a first embodiment, the view schematically illustrating the sheet material machining system.

The outline of a first embodiment will now be described herein with reference to FIG. 1. FIG. 1 is a view of a sheet material machining system 1 according to the first embodiment, the view schematically illustrating the sheet material machining system 1. The sheet material machining system 1 includes a sheet material machining machine 10, a sorting table 20, a temporary placement table 30, a discharge table 40, and a carrier 50. The sheet material machining machine 10 is illustrated in a simplified manner in order to avoid the drawings from being complicated.

The sheet material machining machine 10 is a general-purpose sheet material machining machine, for example. The sheet material machining machine 10 is a machine configured to cut out products from a sheet material, that is, un-machined workpiece Wn. The sheet material machining machine 10 is a laser processing machine, that is, a machine configured to cut out products from an un-machined workpiece Wn with a laser beam, for example. Alternatively, the sheet material machining machine 10 may be a punch press. The sheet material machining machine 10 machines an un-machined workpiece Wn. As a result, a machined workpiece Wd that includes a plurality of products (for example, products A1, A2, B1, and B2) and a residual material G is produced from the un-machined workpiece Wn.

The sorting table 20 is a table onto which the machined workpiece Wd conveyed from the sheet material machining machine 10 is placed. The machined workpiece Wd may be conveyed from the sheet material machining machine 10 to the sorting table 20 by using the carrier 50 or another device than the carrier 50. Onto the sorting table 20, the products (for example, products A1, A2, B1, and B2) and the residual material G are both placed. On the sorting table 20, the products and the residual material G are substantially separate. The products and the residual material G may advantageously be placed on the sorting table 20 with a layout of the products and the residual material immediately after machined by the sheet material machining machine 10 kept maintained. In other words, the products and the residual material G may advantageously be placed on the sorting table 20 so that the products and the residual material G keep a shape of a single plate.

The temporary placement table 30 is a table onto which the plurality of products excluding the residual material G are temporarily placed. In other words, on the temporary placement table 30, the residual material G is not placed, but only the plurality of products are temporarily placed. At this time, the residual material G is left behind on the sorting table 20.

Placing only the plurality of products on the temporary placement table 30 may be implemented by lifting the plurality of products (for example, products A1, A2, B1, and B2) from the sorting table 20 with the residual material G left behind on the sorting table 20 and conveying the plurality of products to the temporary placement table 30. The plurality of products may advantageously be placed on the temporary placement table 30 with the layout of the plurality of products immediately after machined by the sheet material machining machine 10 kept maintained. In other words, the layout of the plurality of products immediately after machined by the sheet material machining machine 10 and a layout of the plurality of products on the temporary placement table 30 may advantageously match each other.

The products (the plurality of products) may be conveyed from the sorting table 20 to the temporary placement table 30 by using the carrier 50 or another device than the carrier 50.

The discharge table 40 is a table onto which at least one product among the plurality of products (for example, products A1, A2, B1, and B2) cut out by the sheet material machining machine 10 is temporarily placed. FIG. 1 illustrates that the products (for example, products A1 and A2) correspond to a first order (a first attracting order) A, that is, the products belonging to a first group, are temporary placed on the discharge table 40. At least one product is conveyed from the temporary placement table 30 to the discharge table 40 by using the carrier 50. The carrier 50 includes attracting actuator 52 and mobile actuator 54. The attracting actuator 52 is capable of attracting at least one product among a plurality of products. The mobile actuator 54 moves the attracting actuator 52 between the temporary placement table 30 and the discharge table 40. The attracting actuator 52 includes a plurality of attracting portions (520A and 520B). The attracting actuator 52 may be vacuum attracting actuator or magnetic attracting actuator that uses a magnetic force. In the example illustrated in FIG. 1, the mobile actuator 54 includes a rail 54A and a mobile object 54B (sliding body). A motor or an electro-magnetic force is used to move the mobile object 54B on the rail 54A. Alternatively or additionally, the mobile actuator 54 may be an industrial robot that includes the attracting actuator 52 on its tip. In this case, the tip of the industrial robot corresponds to the mobile object 54B.

The carrier 50 may advantageously and collectively convey all the products (A1 and A2) corresponding to the first order A from the temporary placement table 30 to the discharge table 40. The conveyance will take place with the products (B1 and B2) corresponding to a second order (a second attracting order) B, that is, the products (B1 and B2) belonging to a second group, left behind on the temporary placement table 30. A layout of all the products (A1 and A2) corresponding to the first order A on the discharge table 40 and a layout of all the products (A1 and A2) corresponding to the first order A immediately after machined by the sheet material machining machine 10 may advantageously match each other.

After that, the products (A1 and A2) corresponding to the first order A are unloaded from the discharge table 40. The products corresponding to the first order A are unloaded from the discharge table 40 manually or by using another carrier than the carrier 50, for example. As illustrated in FIG. 1, the discharge table 40 itself may include wheels 41 so that the discharge table 40 itself functions as another carrier. In the example illustrated in FIG. 1, the discharge table 40 including the wheels 41 is capable of traveling on rails 42 that lie perpendicular to a direction toward which the mobile object 54B moves.

Upon the products (A1 and A2) corresponding to the first order A are unloaded from the discharge table 40, the carrier 50 conveys the products (B1 and B2) corresponding to the second order B from the temporary placement table 30 to the discharge table 40. A layout of all the products (B1 and B2) corresponding to the second order B on the discharge table 40 and a layout of all the products (B1 and B2) corresponding to the second order B immediately after machined by the sheet material machining machine 10 may advantageously match each other.

The products (B1 and B2) corresponding to the second order B and the products (A1 and A2) corresponding to the first order A may temporarily be placed on a single discharge table or separate discharge tables.

The first embodiment includes the sorting table 20, the temporary placement table 30, and the discharge table 40. A plurality of products and a residual material G are to be collectively placed on the sorting table 20. Only the plurality of products are to be temporarily placed on the temporary placement table 30. Some of the plurality of products are to be temporarily placed on the discharge table 40. The plurality of products can thus be efficiently conveyed.

In the first embodiment, products can be placed on the discharge table 40 per order (attracting order). The products are thus sorted per order in an automated manner. In the first embodiment, the products are not sorted manually, shortening a time required for sorting.

In the first embodiment, all products corresponding to each order can be collectively conveyed from the temporary placement table 30 to the discharge table 40. The plurality of products can thus be further efficiently conveyed.

Figure 2:
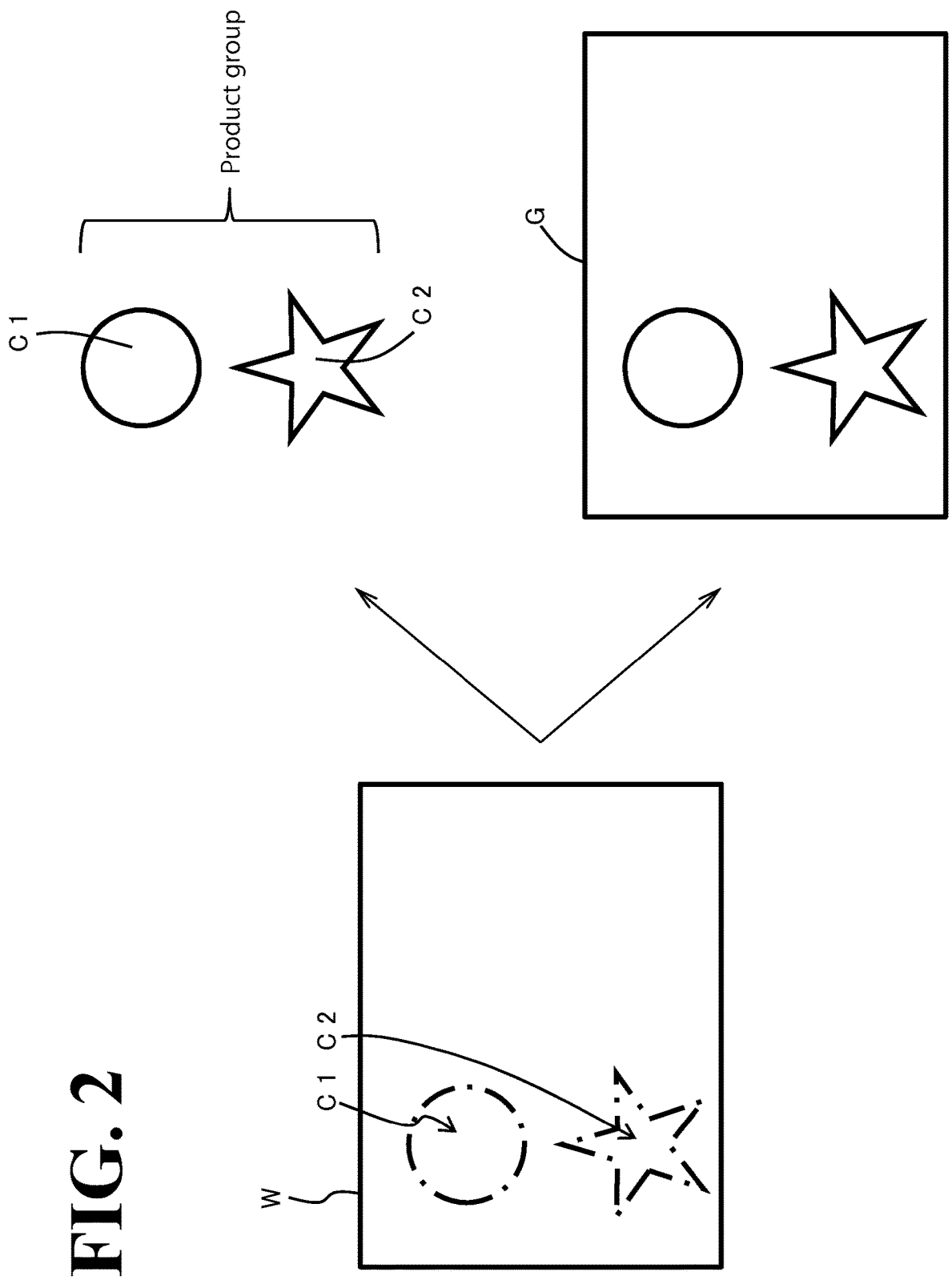
FIG. 2 is a view of a process of cutting out products from a workpiece, the view schematically illustrating the process.
Figure 3:
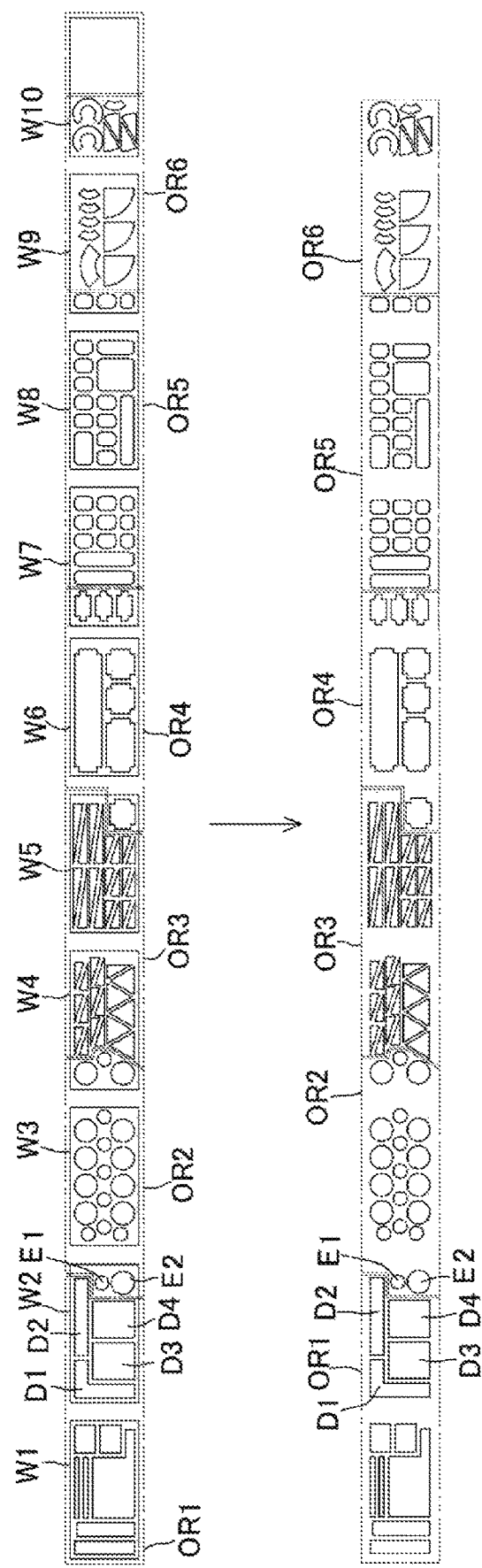
FIG. 3 is a view of a process of cutting out products from workpieces, the view schematically illustrating the process.

Benefits derived from the first embodiment will now further be described herein with reference to FIGS. 1 to 3. With reference to FIG. 2, here assumes that products corresponding to a single order are first to be cut out of a single workpiece. The single order includes products C1 and C2, for example. In this case, the sheet material machining machine cuts out of a workpiece W the products C1 and C2. As a result of cutting out, the workpiece W is separated into a product group including the products C1 and C2 and a residual material G. In the example illustrated in FIG. 2, the residual material has a greater area that will no longer be used, increasing a cost of producing the products.

In response to this problem, in the example illustrated in FIG. 3, products corresponding to two or more orders are cut out of a single workpiece. In FIG. 3, each order corresponds to an area enclosed by a two-dotted line. In the example illustrated in FIG. 3, products corresponding to six orders (OR1 to OR6) are cut out of ten workpieces (W1 to W10). For example, products D1 to D4 included in the first order OR1 and products E1 to E2 included in the second order OR2 are cut out of the workpiece W2. A residual material that will no longer be used is thus reduced in area.

When products corresponding to two or more orders are cut out of a single workpiece, however, the products corresponding to different orders are disposed adjacent to each other. In the example illustrated in FIG. 3, the products D1 to D4 included in the first order OR1 and the products E1 to E2 included in the second order OR2 are disposed adjacent to each other. This configuration however makes sorting of the products per order difficult. In this case, products are supposed to be sorted per order manually, and such manual sorting however requires a lot of time, increasing a production cost.

In response to this problem, the sheet material machining system according to the first embodiment includes, as illustrated in FIG. 1, the sorting table 20 and the temporary placement table 30, in addition to the sheet material machining machine 10 and the discharge table 40. With the sorting table 20 and the temporary placement table 30, work efficiency increases in the sheet material machining system. For example, in the first embodiment, a plurality of products and a residual material machined by the sheet material machining machine 10 are collectively conveyed to the sorting table 20. The sheet material machining machine 10 is thus able to immediately receive and machine a next un-machined workpiece Wn.

Sorting efficiency increases when products are sorted per order. In the first embodiment, the products (A1 and A2) corresponding to the first order A are conveyed to the discharge table 40, and then the products (B1 and B2) corresponding to the second order B are conveyed to the discharge table 40. In other words, products are sorted upon the products are conveyed to the discharge table 40. This eliminates, after a plurality of products are conveyed to the discharge table, sorting of the products per order.

Optional Configuration

A configuration that is optional to the first embodiment will now be described herein. In the example illustrated in FIG. 1, the sorting table 20 is a table disposed separately from the sheet material machining machine 10 and the temporary placement table 30. For example, the sorting table 20 and the sheet material machining machine 10 may be separate by a path through which an operator is able to walk. The sorting table 20 and the temporary placement table 30 may also be separate by a path through which an operator is able to walk. The sorting table 20 is disposed between the sheet material machining machine 10 and the temporary placement table 30, for example.

In the example illustrated in FIG. 1, an upper face of the sorting table 20 is defined so that an area in which the sorting table 20 and a lower face of a machined workpiece Wd come into contact with each other is smaller than an area of the lower face of the machined workpiece Wd. The upper face of the sorting table 20 includes a plurality of projections 22, for example. In this case, the lower face of the machined workpiece Wd comes into contact with each of the plurality of projections 22 via its upper face.

A groove 23 may be disposed between the two adjacent projections 22. In this case, a plurality of grooves 23 are able to accept a fork of the carrier 50. FIG. 1 does not illustrate the fork in order to avoid the drawing from being complicated. The fork may be a fork 58 illustrated in FIG. 10. The plurality of grooves 23 may advantageously be configured so that the fork is able to enter the plurality of grooves from above the sorting table 20, as well as the fork is able to evacuate laterally from the sorting table 20. In other words, the grooves 23 may advantageously be open upward, and ends of the grooves 23 may advantageously reach a side face of the sorting table 20. Each of the grooves 23 has a width of 10 mm or greater, for example. When the plurality of grooves 23 are defined on the upper face of the sorting table 20, a machined workpiece Wd supported by the fork can be placed on the sorting table 20. The placement is achieved when the fork is lowered. In the example illustrated in FIG. 1, the upper face of the sorting table 20 is not a movable face such as a carrier belt, but an immovable face.

In the example illustrated in FIG. 1, the temporary placement table 30 is a table disposed separately from the sheet material machining machine 10 and the sorting table 20. For example, the temporary placement table 30 and the sorting table 20 may be separate by a path through which an operator is able to walk. The temporary placement table 30 and the discharge table 40 may also be separate by a path through which an operator is able to walk. In the example illustrated in FIG. 1, the temporary placement table 30 is disposed between the sorting table 20 and the discharge table 40. The temporary placement table 30 may however be disposed more adjacent to the sheet material machining machine 10 than the sorting table 20. The temporary placement table 30 may otherwise be disposed more distant from the sheet material machining machine 10 than the discharge table 40.

In the example illustrated in FIG. 1, a shape of an upper face of the temporary placement table 30 differs from a shape of the upper face of the sorting table 20. More specifically, the projections are disposed on the upper face of the sorting table 20, while no projection is disposed on the upper face of the temporary placement table 30. In the example illustrated in FIG. 1, the upper face of the temporary placement table 30 is flat. In other words, an area in which the temporary placement table 30 and a lower face of each of plate products come into contact with each other is greater than an area in which the sorting table 20 and the lower face come into contact with each other. The upper face of the temporary placement table 30, which is flat, allows the lower face of each of the plurality of products to fully come into contact with the upper face of the temporary placement table 30. The temporary placement table 30 is thus able to stably support the plurality of products horizontally. The attracting actuator 52 is thus able to attract at least one product among the plurality of products on the temporary placement table 30 with less likelihood of inappropriate attracting. The upper face of the temporary placement table 30, which is flat, allows, when the plurality of products are conveyed from the sorting table 20 to the temporary placement table 30, and the plurality of products are placed on the temporary placement table, a layout (arrangement and orientation) of the plurality of products and a layout of the plurality of products immediately after machined by the sheet material machining machine 10 to match each other, that is, allows the layout of the plurality of products to be kept maintained. In the example illustrated in FIG. 1, the upper face of the temporary placement table 30 is not a movable face such as a carrier belt, but an immovable face.

In the example illustrated in FIG. 1, the discharge table 40 is a table disposed separately from the temporary placement table 30. In the example illustrated in FIG. 1, the discharge table 40 is disposed more distant from the sheet material machining machine 10 than the sorting table 20 and the temporary placement table 30. The discharge table 40 may however be disposed between the sorting table 20 and the temporary placement table 30. In the example illustrated in FIG. 1, the discharge table 40 is only one. A plurality of discharge tables 40 may however exist. The discharge table 40 may be a table that supports a vessel. In this case, products to be conveyed by the carrier 50 are loaded to the vessel on the discharge table 40.

In the first embodiment, the mobile actuator 54 of the carrier 50 may move the attracting actuator 52 between the sorting table 20 and the temporary placement table 30. In this case, the carrier 50 is able to convey products on the sorting table 20 to the temporary placement table 30. Causing the carrier 50 to convey products from the temporary placement table 30 to the discharge table 40, and from the sorting table 20 to the temporary placement table 30 can reduce a carrier count.

In the first embodiment, the sheet material machining system 1 may include a controller 56 configured to separately activate or deactivate each of the plurality of attracting portions (520A and 520B). The controller 56 is communicably coupled to the carrier 50 in a wired or wireless manner to send a control signal to the carrier 50. When the attracting portions (520A and 520B) are attracting portions (attracting pads) configured to perform vacuum attracting, the controller 56 opens or closes a flow channel between each of the attracting portions and a vacuum pump. For example, the controller 56 opens or closes flow channels between each of the first attracting portions 520A and the vacuum pump, and between each of the second attracting portions 520B and the vacuum pump. When the flow channels that are in communication with the first attracting portions 520A and the flow channels that are in communication with the second attracting portions 520B are both open, the attracting actuator 52 is able to simultaneously attract the products A1 and A2. On the other hand, when the flow channels that are in communication with the first attracting portions 520A are open, while the flow channels that are in communication with the second attracting portions 520B are closed, the attracting actuator 52 is able to attract the product A1 only with the product A2 left behind on the sorting table 20. When the attracting portions (520A and 520B) are magnetic attracting portions, the controller 56 may control how electromagnets configuring the attracting portions are powered. In the example illustrated in FIG. 1, the controller 56 is disposed outside the carrier 50. Alternatively, the controller 56 may be disposed inside the carrier 50.

In the sheet material machining system 1 that includes the controller 56 configured to separately activate or deactivate each of the plurality of attracting portions (520A and 520B), the attracting actuator 52 is able to freely change how many products are to be attracted. The carrier 50 is thus able to collectively convey products in accordance with the number of products to be conveyed at a time or the number of products per order.

How collectively conveying products benefits will now further be described herein. For example, assume that the attracting actuator 52 collectively attracts all of a plurality of products (for example, products A1, A2, B1, and B2) placed on the sorting table 20, and the mobile actuator 54 conveys all of the plurality of collectively attracted products (for example, products A1, A2, B1, and B2) from the sorting table 20 to the temporary placement table 30.

When the attracting actuator 52 attracts products on the sorting table 20, a residual material G would be likely to move unintentionally. For example, assume that there is a minute gap between each of the products and the residual material G. In this case, when the attracting actuator 52 attracts the products, the products and the residual material G would be likely to come into contact with each other, causing the residual material G to move as a result. For example, when the sheet material machining machine 10 uses a $CO_2$ laser, a sheet material is cut with the $CO_2$ laser at a cutting width of approximately 0.2 mm. When the sheet material machining machine 10 includes an optical fiber laser device, the optical fiber laser cuts a sheet material at a cutting width of approximately 0.1 mm. When a cutting width of a sheet material is 0.2 mm or narrower, a gap between a product and a residual material G reaches 0.2 mm or narrower. Therefore, when the attracting actuator 52 attracts the products, a risk of contact between the attracted products and the residual material G increases. It can be assumed that, as the technology develops, laser devices are able to cut a sheet material with a narrower cutting width. In such a case, a risk of contact between products and a residual material G further increases. Also, the greater the plate thickness of a machined workpiece Wd to be placed on the sorting table 20, the more the risk of contact between products and a residual material G.

In response to the above described risk, the controller 56 may advantageously activate or deactivate each of the plurality of attracting portions (520A and 520B) so that the attracting actuator 52 collectively attracts all the plurality of products (for example, products A1, A2, B1, and B2) placed on the sorting table 20. When all products are collectively attracted, such an event that a residual material is moved due to attracting would not be problematic, since collectively attracting all the products means that there is no product left behind together with a residual material on the sorting table. Such an event that any products move in position when a residual material moves does not arise, accordingly. In the example illustrated in FIG. 1, the four products (A1, A2, B1, and B2) are placed on the sorting table 20. To collectively attract the four products, it is required that the attracting actuator 52 include at least four attracting portions.

With respect to this requirement, here assumes that the attracting actuator 52 attracts only one product among the plurality of products placed on the sorting table 20. In this case, a residual material that moves in position due to attracting causes the remaining products to move in position on the sorting table 20. The attracting actuator 52 is thus not able to securely attract the remaining products in the next time.

One idea to prevent the above described movement in position from occurring can be temporarily securing a machined workpiece Wd (for example, residual material G), via a fixture, onto the sorting table 20. When the machined workpiece Wd (for example, residual material G) is secured onto the sorting table 20, however, another problem can arise if a product to be attracted and a residual material G are not fully separate. In other words, when the product to be attracted is attracted and lifted, while the residual material G that has not yet been separate from the product is secured onto the sorting table 20, an unexpected force could apply to the attracting portions 520 or the fixture. The attracting portions 520 or the fixture could be damaged, as a result. If the product to be attracted is forcibly lifted, the machined workpiece Wd could deform. On the other hand, in the first embodiment, no machined workpieces Wd are secured onto the sorting table 20, and the attracting actuator 52 collectively attracts all the plurality of products (for example, products A1, A2, B1, and B2) placed on the sorting table 20. The plurality of products are thus prevented from moving in position. In addition, even if a product to be attracted and a residual material G are not fully separate, the residual material G that is not secured onto the sorting table 20, for example, does not apply an excessive force onto the attracting portions 520. The attracting portions 520 are thus free from damage.

With the embodiment, collectively attracting all of a plurality of products placed on the sorting table 20 can fully resolve such problems derived from remaining products that move in position. Such a new problem that a residual material moves due to attracting is particular to the sheet material machining system that includes a sheet material machining machine configured to cut out products from a plate workpiece. The configuration in which, by focusing on the problem, all of a plurality of products placed on the sorting table 20 are collectively attracted is a breakthrough idea.

In the example illustrated in FIG. 1, the temporary placement table 30 is disposed in a region between the sorting table 20 and the discharge table 40. In this case, products are conveyed in the shortest distance from the sorting table 20 to the temporary placement table 30 and from the temporary placement table 30 to the discharge table 40. In particular, when products are conveyed from the sorting table 20 to the temporary placement table 30 and from the temporary placement table 30 to the discharge table 40 by the single carrier 50, a reduction in conveyance distance by the carrier 50 effectively improves conveyance efficiency.

Operation Method for Sheet Material Machining System

Figure 4:
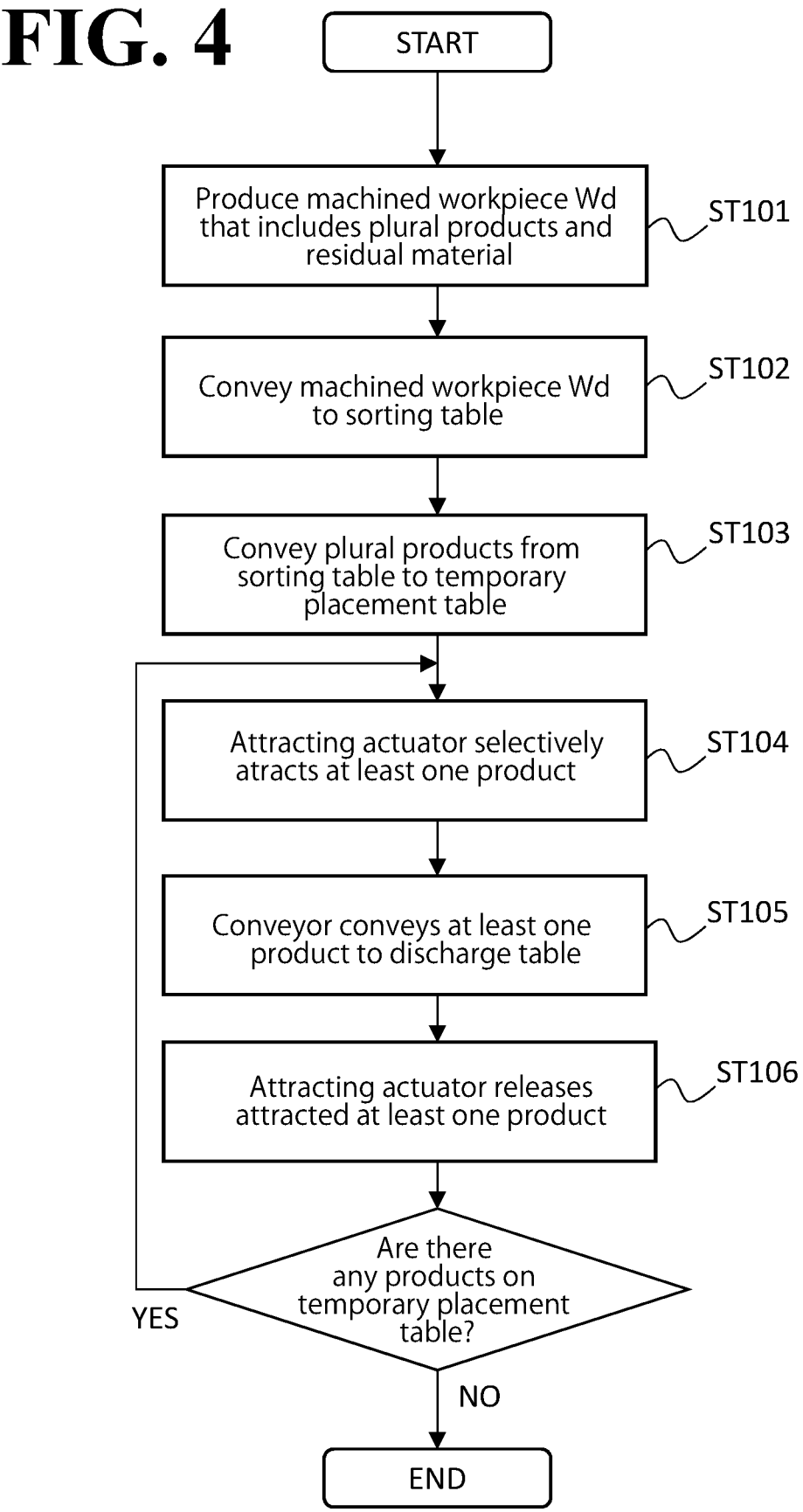
FIG. 4 is a flowchart of a method for operating the sheet material machining system, the flowchart illustrating an example.

A method for operating the sheet material machining system 1 will now be described herein with reference to FIG. 4. FIG. 4 is a flowchart of the method for operating the sheet material machining system 1, the flowchart illustrating an example.

In first step ST101, the sheet material machining machine 10 machines an un-machined workpiece Wn to produce a machined workpiece Wd that includes a plurality of products and a residual material G. The machining is performed through laser machining, for example.

In second step ST102, the machined workpiece Wd is conveyed from the sheet material machining machine 10 to the sorting table 20. The conveyance step corresponds to a first conveyance step. The conveyance may be performed by the carrier 50 or another carrier.

In third step ST103, with the residual material G left behind on the sorting table 20, the plurality of products are conveyed from the sorting table 20 to the temporary placement table 30. The conveyance step corresponds to a second conveyance step. The conveyance may be performed by the carrier 50 or another carrier.

In fourth step ST104, the attracting actuator 52 selectively attracts at least one product from among the plurality of products placed on the temporary placement table 30. The selective attracting is carried out when the controller 56 separately activates or deactivates each of the plurality of attracting portions (520A and 520B), for example.

In fifth step ST105, the carrier 50 conveys the at least one product attracted by the attracting actuator 52 from the temporary placement table 30 to the discharge table 40. The conveyance step corresponds to a third conveyance step.

In sixth step ST106, the attracting actuator 52 releases the attracted at least one product above the discharge table 40. The at least one product is as a result placed on the discharge table 40.

With the above-described steps, the plurality of products can be efficiently conveyed. In second step ST102, described above, the plurality of products and the residual material G are collectively conveyed to the sorting table 20, resulting in higher efficiency in conveying the plurality of products. Collectively unloading the plurality of products and the residual material G from the sheet material machining machine 10 allows the sheet material machining machine 10 to immediately accept a next un-machined workpiece Wn.

In third step ST103, collectively conveying all the products included in the machined workpiece Wd from the sorting table 20 to the temporary placement table 30 does not lead to a risk of movement in position in the products due to such an event that the residual material moves, as described above.

In fourth step ST104 to sixth step ST106, at least one product may advantageously be selectively attracted per order. For example, in fourth step ST104, the attracting actuator 52 attracts all the products corresponding to the first order A. Next, in fifth step ST105, the carrier 50 conveys all the products corresponding to the first order A from the temporary placement table 30 to the discharge table 40. In sixth step ST106, the attracting actuator 52 then releases all the attracted products corresponding to the first order A. All the products corresponding to the first order A are thus placed on the discharge table 40. If products corresponding to another order are left behind on the temporary placement table 30, fourth step ST104 resumes. Next, in fourth step ST104, the attracting actuator 52 attracts all the products corresponding to the second order B. Next, in fifth step ST105, the carrier 50 conveys all the products corresponding to the second order B from the temporary placement table 30 to the discharge table 40. In sixth step ST106, the attracting actuator 52 then releases all the attracted products corresponding to the second order B. All the products corresponding to the second order B are thus placed on the discharge table 40. Before all the products corresponding to the second order B are placed on the discharge table 40, all the products corresponding to the first order A may advantageously be unloaded from the discharge table 40. Alternatively, the products corresponding to the first order A and the products corresponding to the second order B may be placed on discharge tables 40 that are distinct from each other. In this case, all the products corresponding to the first order A may not always be unloaded beforehand from the discharge table 40.

Figure 5:
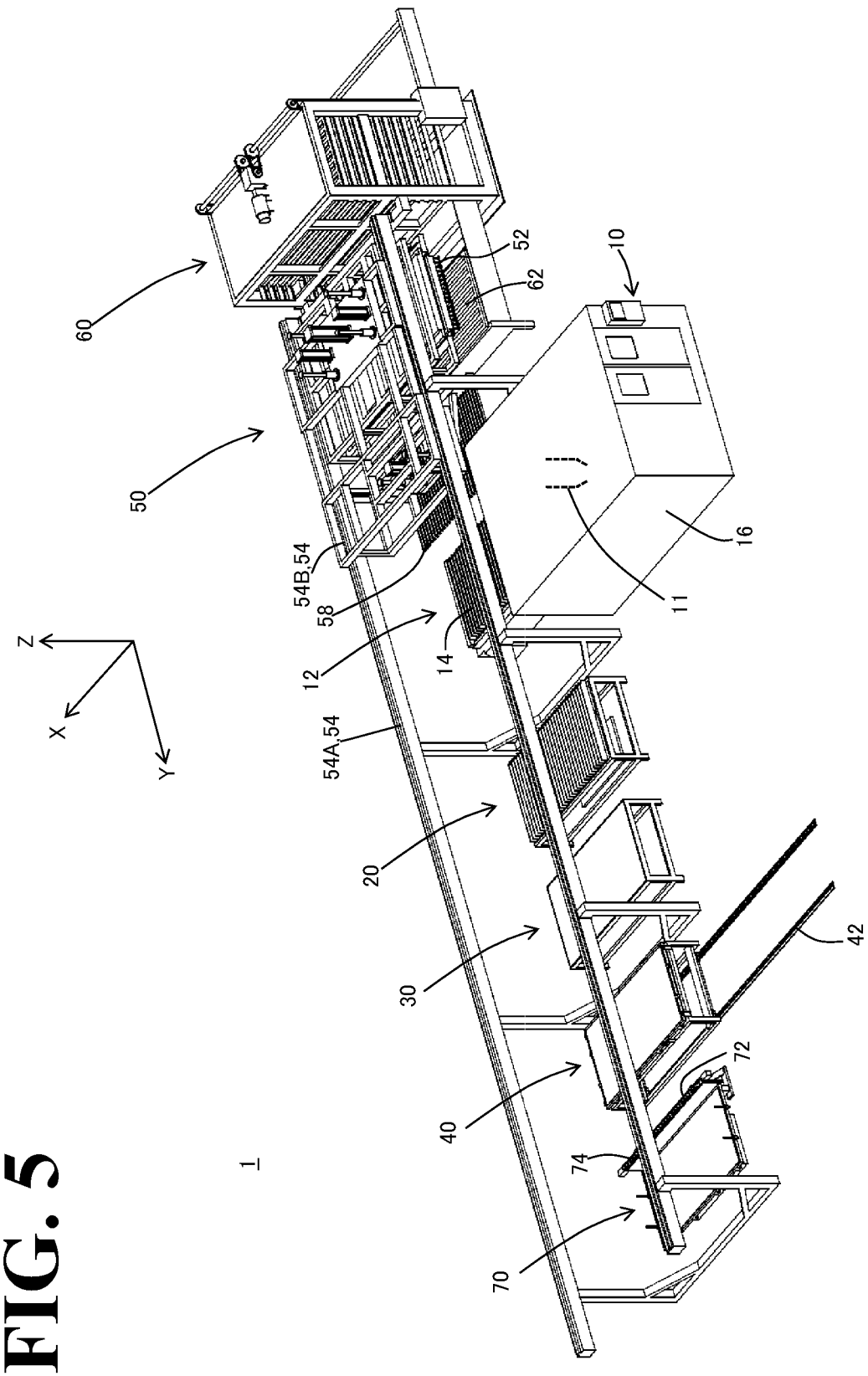
FIG. 5 is a schematic perspective view of the sheet material machining system according to the first embodiment.
Figure 6:
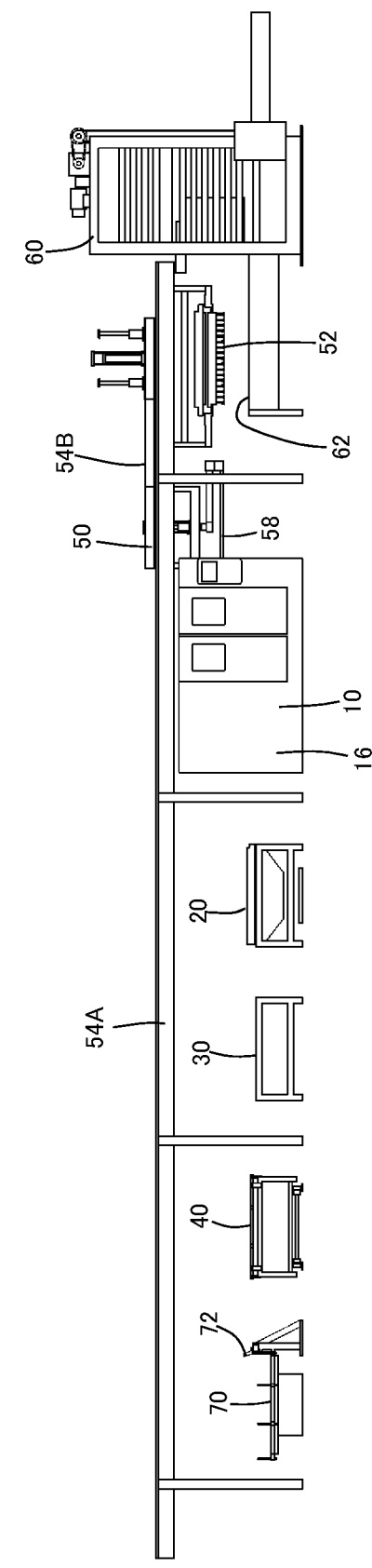
FIG. 6 is a schematic front view of the sheet material machining system according to the first embodiment.
Figure 7:
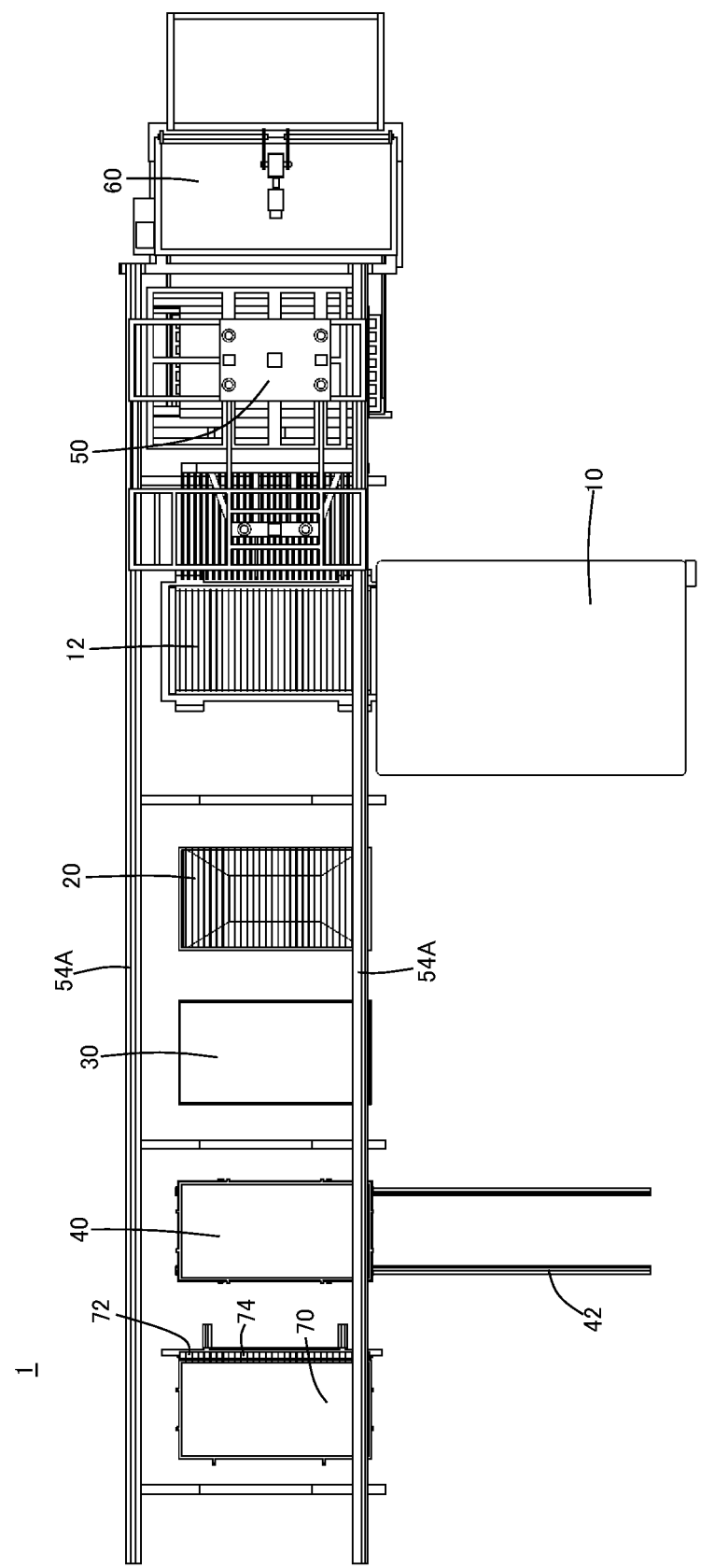
FIG. 7 is a schematic plan view of the sheet material machining system according to the first embodiment.
Figure 8:
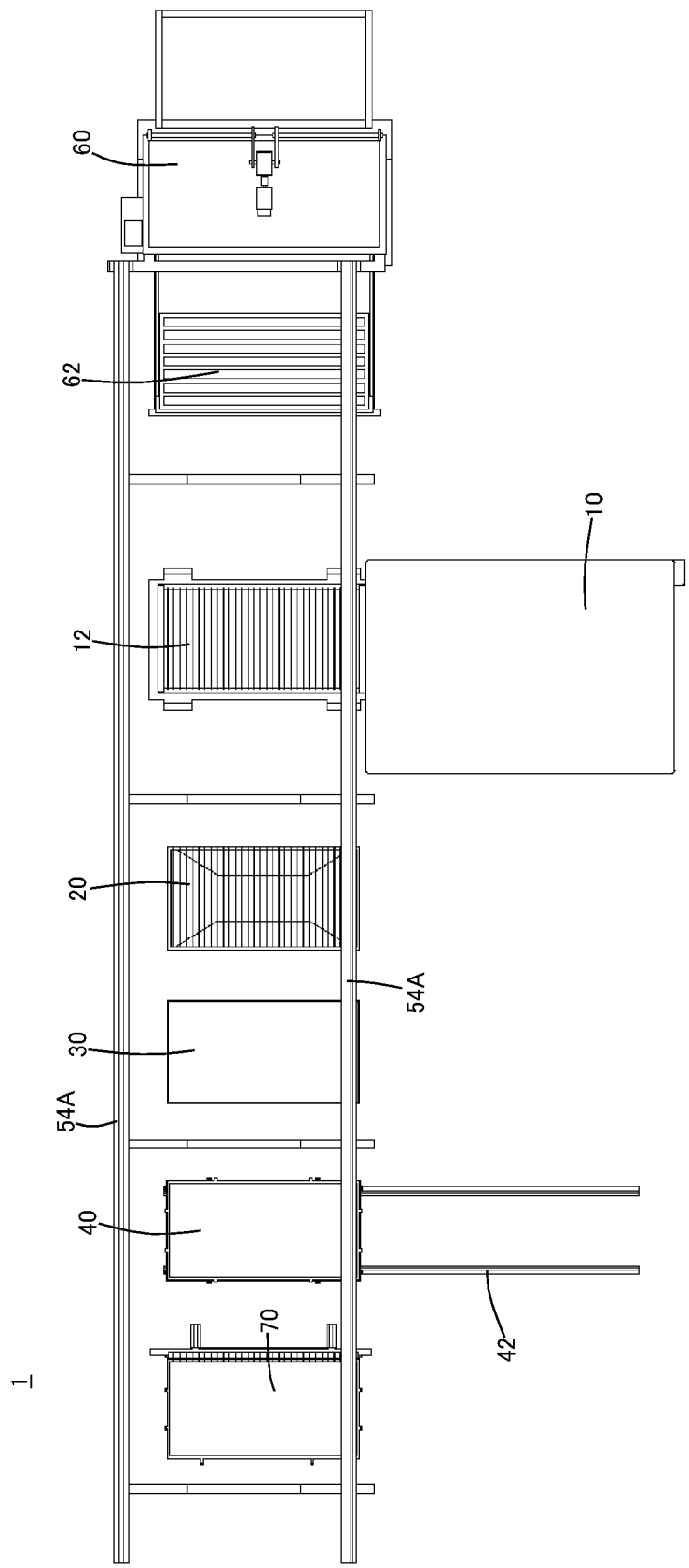
FIG. 8 is a schematic plan view of the sheet material machining system according to the first embodiment.
Figure 9:
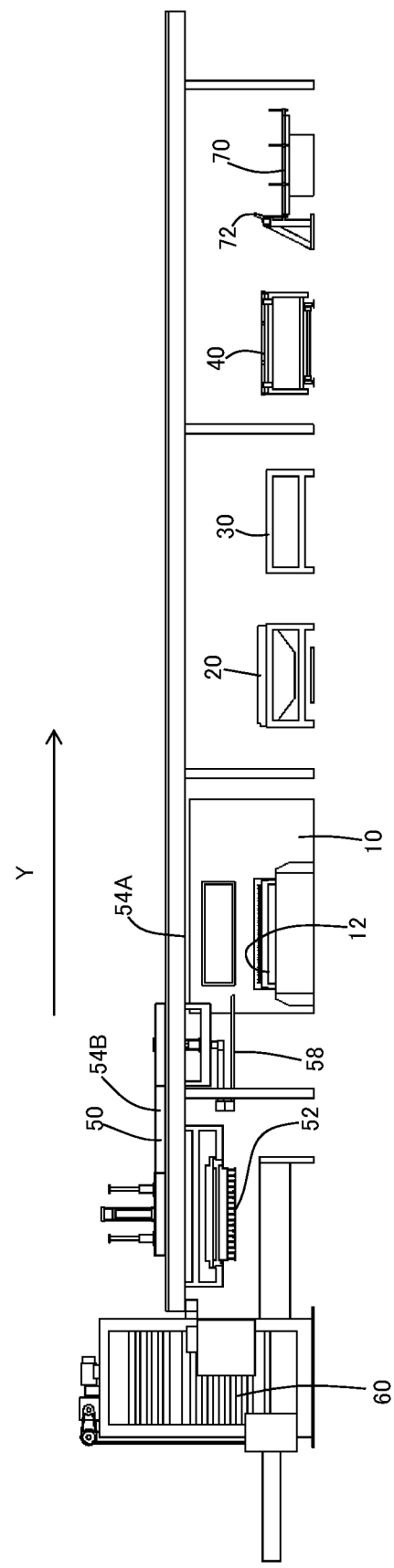
FIG. 9 is schematic rear view of the sheet material machining system according to the first embodiment.
Figure 10:
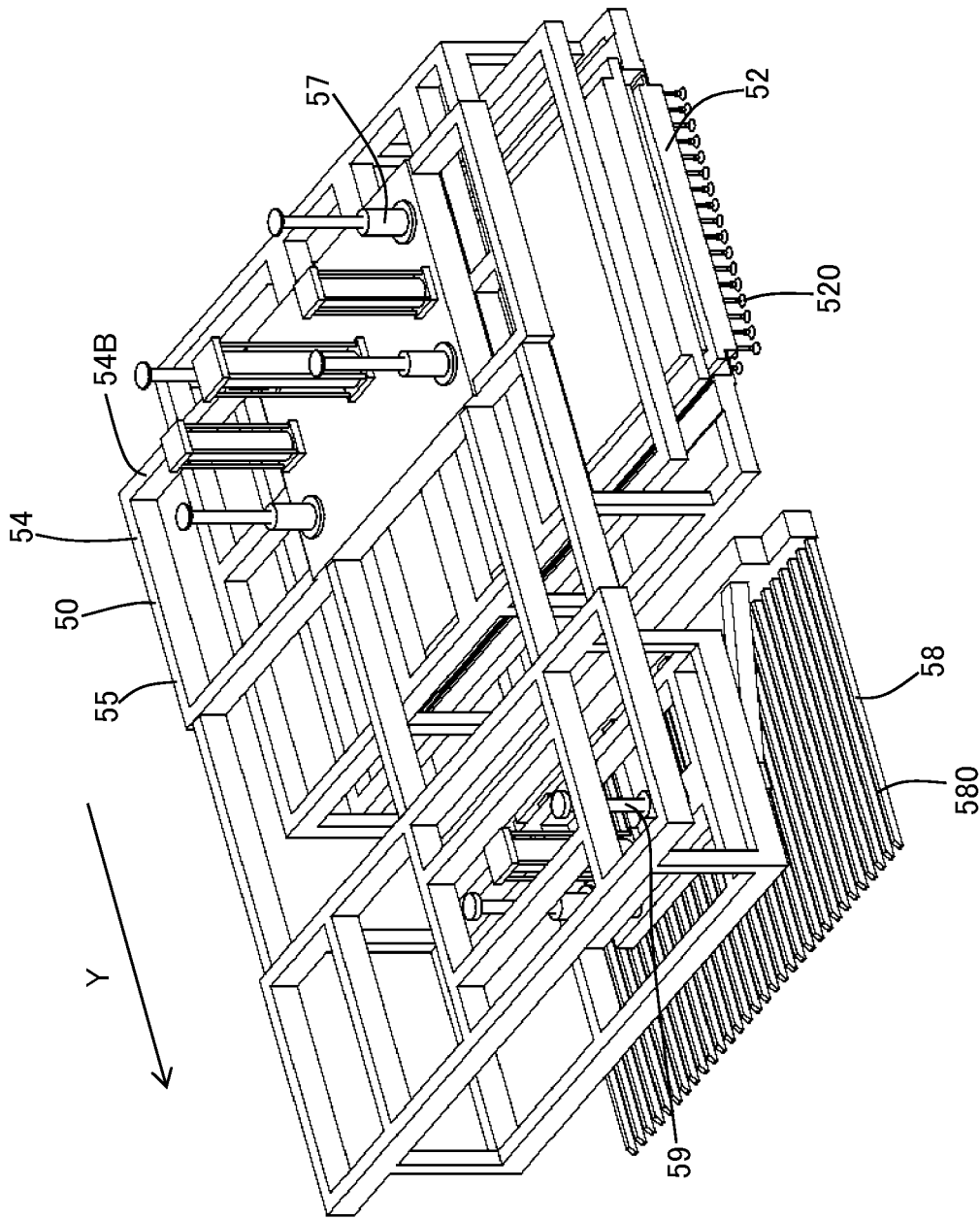
FIG. 10 is a schematic perspective view of a part of a carrier, more specifically, a part of the mobile object of the carrier, the schematic perspective view illustrating the part of the mobile object when viewed obliquely from above.
Figure 11:
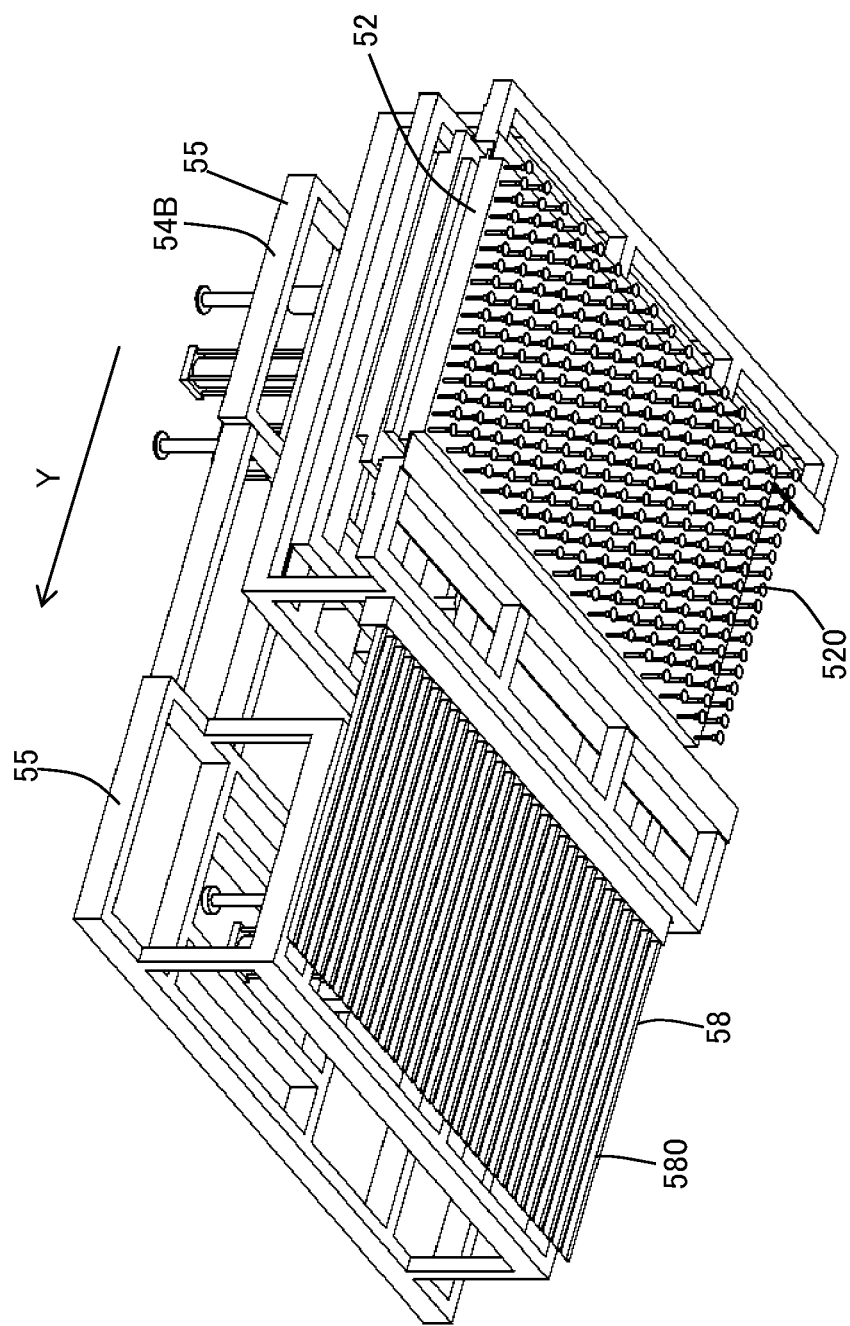
FIG. 11 is a schematic perspective view of the part of the carrier, more specifically, the part of the mobile object of the carrier, the schematic perspective view illustrating the part of the mobile object when viewed obliquely from below.
Figure 12:
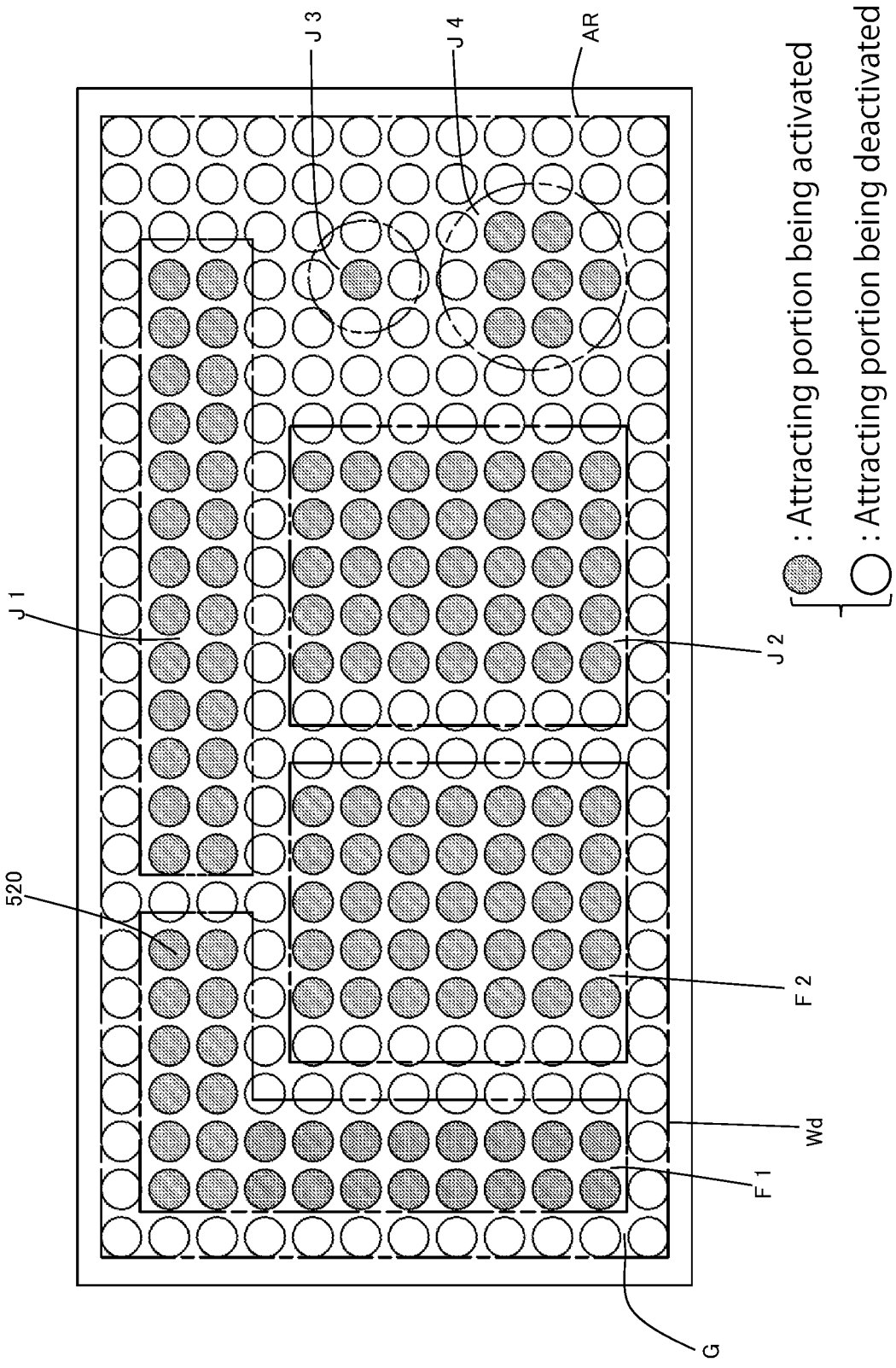
FIG. 12 is a view of attracting portions, the view schematically illustrating how the attracting portions are activated or deactivated.

The sheet material machining system 1 according to the first embodiment will now be described in more detail with reference to FIGS. 5 to 12. FIG. 5 is a schematic perspective view of the sheet material machining system 1 according to the first embodiment. FIG. 6 is a schematic front view of the sheet material machining system 1 according to the first embodiment. FIG. 7 is a schematic plan view of the sheet material machining system 1 according to the first embodiment. FIG. 8 is a schematic plan view of the sheet material machining system 1 according to the first embodiment. In FIG. 8, the mobile object and the attracting actuator are omitted. FIG. 9 is a schematic rear view of the sheet material machining system 1 according to the first embodiment. FIG. 10 is a schematic perspective view of a part of the carrier 50, more specifically, a part of the mobile object 54B of the carrier, the schematic perspective view illustrating the part of the mobile object 54B when viewed obliquely from above. FIG. 11 is a schematic perspective view of the part of the carrier 50, more specifically, the part of the mobile object 54B of the carrier, the schematic perspective view illustrating the part of the mobile object 54B when viewed obliquely from below. FIG. 12 is a schematic view of the attracting portions, the schematic view illustrating how the attracting portions are activated or deactivated.

The first embodiment will now be described herein in detail, by focusing on the contents that have not been described in the outline (see FIGS. 1 and 4) of the first embodiment.

With reference to FIG. 5, the sheet material machining system 1 includes the sheet material machining machine 10, the sorting table 20, the temporary placement table 30, the discharge table 40, and the carrier 50. The sheet material machining system 1 may include a workpiece stocker 60 and/or a residual material table 70. In FIG. 5, the carrier 50 includes the mobile actuator 54. The mobile actuator 54 includes the rail 54A and the mobile object 54B that is movable relative to the rail. A direction toward which the mobile object 54B moves from the sheet material machining machine 10 to the sorting table 20 is referred to as direction Y, a vertical direction is referred to as direction Z, and a direction that is perpendicular to both direction Y and direction Z is referred to as direction X.

The workpiece stocker 60 stores a plurality of workpieces. Each of the workpieces is an un-machined workpiece Wn that is not yet machined by the sheet material machining machine 10. The un-machined workpiece Wn is a metallic sheet material, for example. The workpiece stocker 60 includes a workpiece loading table 62. The workpiece loading table 62 may be a carrier such as a roller carrier. The un-machined workpiece Wn placed on the workpiece loading table 62 is conveyed by the carrier 50 to a workpiece delivery table 12 of the sheet material machining machine 10. The un-machined workpiece Wn may be conveyed to the workpiece delivery table 12 while being supported by the attracting actuator 52.

The un-machined workpiece Wn placed on the workpiece delivery table 12 is conveyed by a workpiece conveyance mechanism included in the sheet material machining machine 10 to a position adjacent to a machining head 11. For example, the un-machined workpiece Wn placed on the workpiece delivery table 12 (for example, pallet-type workpiece delivery table) is conveyed to the position adjacent to the machining head 11. The sheet material machining machine 10 may include a workpiece machining chamber 16. Inside the workpiece machining chamber 16, the machining head 11 that includes a laser nozzle is disposed, for example. The machining head 11 separates the un-machined workpiece Wn into a plurality of products and a residual material G. A machined workpiece Wd that includes the plurality of products and the residual material G is conveyed by the workpiece conveyance mechanism included in the sheet material machining machine 10 from the position adjacent to the machining head 11 to a position for picking-up by the carrier 50. For example, the machined workpiece Wd placed on the workpiece delivery table 12 is conveyed from the position adjacent to the machining head 11 to a position illustrated in FIG. 5.

The machined workpiece Wd placed on the workpiece delivery table 12 of the sheet material machining machine 10 is conveyed by the carrier 50 to the sorting table 20. When the machined workpiece Wd are to be conveyed from the workpiece delivery table 12 to the sorting table 20, the machined workpiece Wd may advantageously be supported by the fork 58, described later. Supporting the machined workpiece Wd with the fork 58 maintains a layout of the plurality of products and the residual material on the machined workpiece Wd.

In order to support the machined workpiece Wd with the fork 58, grooves 14 capable of accepting the fork 58 may advantageously be defined on an upper face of the workpiece delivery table 12. When a plurality of projections are defined on the upper face of the workpiece delivery table 12, each of the grooves 14 is defined between the two adjacent projections. Each of the plurality of projections may advantageously has a saw-blade shape (that is, a shape in which apexes that support the machined workpiece Wd and bottoms are alternately disposed). Alternatively, a plurality of needle-shaped protrusions may be disposed on the upper face of the workpiece delivery table 12. When the plurality of needle-shaped protrusions are disposed along a plurality of straight lines, a region between the two straight lines adjacent to each other, among the plurality of straight lines, functions as each of the grooves 14 capable of accepting the fork 58.

When a plurality of dot-shaped portions (for example, a plurality of apexes included in a saw-blade shape or apexes of a plurality of needle-shaped protrusions corresponds to the "plurality of dot-shaped portions") are defined on the upper face of the workpiece delivery table 12, a lower face of a workpiece placed on the upper face of the workpiece delivery table 12 and the workpiece delivery table 12 come into contact with each other at a smaller area. In this case, the workpiece on the workpiece delivery table 12 can easily be laser-machined, for example.

In the first embodiment, the machined workpiece Wd (the plurality of products and the residual material) on the workpiece delivery table 12 is immediately conveyed to the sorting table 20. Dross (a material melted during the machining and adhered onto the lower face of the workpiece) generated during the machining would be therefore less likely to be accumulated on the plurality of dot-shaped portions or gaps between the dot-shaped portions.

The machined workpiece Wd supported by the plurality of dot-shaped portions can be lifted more stably from the workpiece delivery table 12 by scooping with the fork 58, rather than by attracting and lifting with the attracting portions. In the first embodiment, the machined workpiece Wd is lifted with the fork 58 from the workpiece delivery table 12. On the other hand, the sorting table 20 includes the plurality of projections, and the machined workpiece Wd on the sorting table 20 accordingly comes into line contact with the projections. In other words, a plurality of line-shaped portions are defined on the upper face of the sorting table 20. The machined workpiece Wd supported by the plurality of line-shaped portions can be placed more easily and evenly along a horizontal surface than a machined workpiece Wd supported by the plurality of dot-shaped portions. The machined workpiece Wd (that is, the plurality of products) placed on the plurality of line-shaped portions of the sorting table 20 can thus be easily lifted by using the plurality of attracting portions.

In the example illustrated in FIG. 5, the sorting table 20, the temporary placement table 30, and the discharge table 40 are disposed in a straight line that is parallel to direction Y. The mobile object 54B of the carrier 50 is thus able to pass vertically upward over the sorting table 20, the temporary placement table 30, and the discharge table 40. In the example illustrated in FIG. 5, in addition to the sorting table 20, the temporary placement table 30, and the discharge table 40, the workpiece delivery table 12, the workpiece loading table 62, and the residual material table 70 are also disposed in the above-described straight line that is parallel to direction Y.

The carrier 50 includes the mobile actuator 54 and the attracting actuator 52. The mobile actuator 54 transfers products, for example. The attracting actuator 52 attracts and holds the products, for example. The carrier 50 may advantageously include, in addition to first holding means, that is, the attracting actuator 52, second holding means, such as the fork 58. The first and second holding means partially configure the mobile object 54B. With the first holding means holding products, the carrier 50 moves the mobile object 54B along direction Y to transfer the products in direction Y. With the second holding means holding a residual material G or a machined workpiece Wd, the carrier 50 moves the mobile object 54B along direction Y to transfer the residual material G or the machined workpiece Wd in direction Y. A more specific configuration of the mobile object 54B that includes the first and second holding means will be described later with reference to FIGS. 10 to 12.

The residual material table 70 is a table onto which a residual material G, that is, a remaining portion of an un-machined workpiece Wn, which is produced when products are cut out, is placed. As illustrated in FIG. 5, the residual material table 70 may include a stopper 72 (that is, withdrawal means) that comes into contact with and withdraws the residual material G from the mobile object 54B onto the residual material table 70. Similar to an unacceptable workpiece stopper 43A (see FIG. 15), described later, the stopper 72 may include a plurality of protrusions 74. In this case, when the fork 58 passes through gaps between the protrusions 74 and move back (in the example illustrated in FIG. 5, move in a direction from the residual material table 70 lying at an end in direction Y toward the sheet material machining machine 10), the stopper 72 withdraws the residual material G.

In the example illustrated in FIG. 5, the residual material table 70 is disposed downstream from the sorting table 20, the temporary placement table 30, and the discharge table 40, that is, distant from the sheet material machining machine 10. Alternatively, the residual material table 70 may be disposed between the temporary placement table 30 and the discharge table 40, between the sorting table 20 and the temporary placement table 30, between the sorting table 20 and the sheet material machining machine 10 (specifically, workpiece delivery table 12), or between the sheet material machining machine 10 and the workpiece stocker 60.

Configuration of Mobile Object

An example configuration of the mobile object 54B included in the carrier 50 will now be described herein in detail with reference to FIGS. 10 to 12. FIG. 10 is a schematic perspective view of a part of the mobile object 54B included in the carrier 50, the schematic perspective view illustrating the part of the mobile object 54B when viewed obliquely from above. FIG. 11 is a schematic perspective view of the part of the mobile object 54B included in the carrier 50, the schematic perspective view illustrating the part of the mobile object 54B when viewed obliquely from below. FIG. 12 is a schematic view of the attracting portions, the schematic view illustrating how the attracting portions are activated or deactivated.

The mobile object 54B includes a mobile object body 55, the attracting actuator 52, and the fork 58. The attracting actuator 52 is capable of attracting at a time a plurality of products (for example, products F1 and F2 illustrated in FIG. 12). The fork 58 is capable of holding at a time the plurality of products and a residual material G. The attracting actuator 52 configures the first holding means in the mobile object 54B. The fork 58 configures the second holding means in the mobile object 54B.

The attracting actuator 52 is liftably supported by the mobile object body 55. The attracting actuator 52 may be lifted relative to the mobile object body 55 with lifting actuators 57 (for example, lifting cylinder devices). The attracting actuator 52 includes the plurality of attracting portions 520. The attracting portions 520 may be suckers that suck products with vacuum, for example, or electromagnets that attract the products with a magnetic force, for example.

The attracting actuator 52 activates or deactivates each of the plurality of attracting portions 520 so that the attracting actuator 52 attract products, but does not attract a residual material G surrounding the products. For example, in the example illustrated in FIG. 12, each of the plurality of attracting portions 520 that is illustrated with hatching is activated, and is accordingly able to attract products F1, F2, J1, J2, J3, and J4. On the other hand, each of the plurality of attracting portions 520 that is not illustrated with hatching is deactivated. The attracting actuator 52 therefore is not able to attract the residual material G in the machined workpiece Wd. The attracting portions are each activated or deactivated by the controller 56 included in the sheet material machining system 1.

In the first embodiment, the mobile object 54B includes the plurality of attracting portions 520 illustrated in FIGS. 10 to 12. The sheet material machining system 1 includes the controller 56 configured to separately activate or deactivate each of the plurality of attracting portions 520. The plurality of attracting portions 520 collectively attracts all products (that is, all of a plurality of products) in a machined workpiece Wd placed on the sorting table 20, but does not attract a residual material G placed on the sorting table 20. After that, the mobile object 54B collectively conveys all the products to the temporary placement table 30. When the plurality of attracting portions 520 attract all the products, the residual material G would be likely to move in position. All the products are however already separate by the attracting portions 520 from the residual material G. The products thus do not move in position even if the residual material G moves in position.

In the example illustrated in FIG. 12, the attracting actuator 52 includes the 288 attracting portions 520 (24× 12=288). The attracting portions 520 are not however limited to 288 in number. The attracting portions may be 500 or more, 1000 or more, or 5000 or more in number. When the plurality of attracting portions 520 are disposed, along a flat surface at predetermined intervals, in a region having an area identical or greater than an area of an un-machined workpiece Wn, the plurality of attracting portions 520 are able to advantageously and collectively attract a plurality of products disposed along a horizontal surface. In the example illustrated in FIG. 12, in order to allow the plurality of attracting portions 520 to fully support a machined workpiece Wd or an un-machined workpiece Wn, an area of a region AR in which the plurality of attracting portions are disposed and an area of the un-machined workpiece Wn match each other. The area of the region AR is however appropriately selectable in accordance with an area of an un-machined workpiece Wn. The area of the region AR is, when the attracting portions are disposed in a rectangular shape, an area of the rectangular, or, when the attracting portions are disposed in a non-rectangular shape, an area of a shape defined by connecting with straight lines the plurality of attracting portions each lying at outer edges. Even when a shape of a product or a residual material is complicated, a gap between the two adjacent attracting portions 520 can appropriately be set so as to securely attract the product only. Even when a shape of a product or a residual material is complicated, density of the attracting portions 520 disposed in the region AR can appropriately be set so as to securely attract the product only. In the example illustrated in FIG. 12, the plurality of attracting portions are disposed along a plurality of straight lines. The arrangement of the plurality of attracting portions is not limited to the example illustrated in FIG. 12.

As illustrated in FIG. 12, the controller 56 may control the attracting portions so that the attracting portions 520 each being activated define an L-shape (corresponding to a shape of the product F1), a rectangular shape (corresponding to shapes of the products F2, J1, and J2), or a circular shape (corresponding to shapes of the products J3 and J4).

As illustrated in FIG. 12, the controller 56 may alter the number of the attracting portions 520 each to be activated in accordance with a size of a product to be attracted (an area of the product). In other words, the greater the size of a product to be attracted, the more the controller 56 activates the attracting portions in number. For example, in the example illustrated in FIG. 12, an area of the product J2 is greater than an area of the product J1. The controller 56 has thus increased the number of the attracting portions 520 to be activated in accordance with the product J2 that has the greater area, from the number of the attracting portions 520 that were activated in accordance with the product J1 that has the smaller area.

Next, the fork 58 will now be described herein with reference to FIG. 10. The fork 58 is liftably supported by the mobile object body 55. The fork 58 may be lifted relative to the mobile object body 55 with lifting actuators 59 (for example, lifting cylinder devices). The fork 58 includes a plurality of elongated members 580. The plurality of elongated members 580 each disposed in parallel define the fork 58. The elongated members 580 each extend in parallel to direction Y. A direction toward which the fork extends from its base to its tip corresponds to a direction toward which the fork moves away from the attracting actuator 52.

For example, assume that a machined workpiece Wd supported by the fork 58 is transferred to the sorting table 20 illustrated in FIG. 5. In this case, the fork 58 is first moved to a vertically upward position above the sorting table 20. The fork 58 is then lowered so that the elongated members 580 of the fork 58 enter the grooves 23 on the sorting table. As a result, the machined workpiece Wd is placed on the sorting table 20.

In the example illustrated in FIG. 10, the mobile object 54B includes both the first holding means (for example, attracting actuator 52) and the second holding means (for example, fork 58). The first holding means selectively holds only a product in a machined workpiece Wd without holding a residual material G in the machined workpiece Wd. The second holding means collectively holds the product and the residual material G in the machined workpiece Wd. The second holding means can be used to collectively convey the product and the residual material G from the sheet material machining machine 10 to the sorting table 20, while the first holding means can be used to convey only the product from the sorting table 20 to the temporary placement table 30.

In the example illustrated in FIG. 10, the mobile object 54B includes both the first holding means and the second holding means. This configuration reduces a mobile object count, compared with a case when a mobile object is provided per holding means. The mobile object 54B that includes both the first holding means and the second holding means is solely able to switch a machined workpiece Wd and an un-machined workpiece Wn on the workpiece delivery table 12. In other words, while the un-machined workpiece Wn is supported by the first holding means, the machined workpiece Wd can be lifted with the second holding means from the workpiece delivery table 12. After that, while the machined workpiece Wd is supported by the second holding means, the un-machined workpiece Wn can be transferred from the first holding means to the workpiece delivery table 12.

Figure 13:
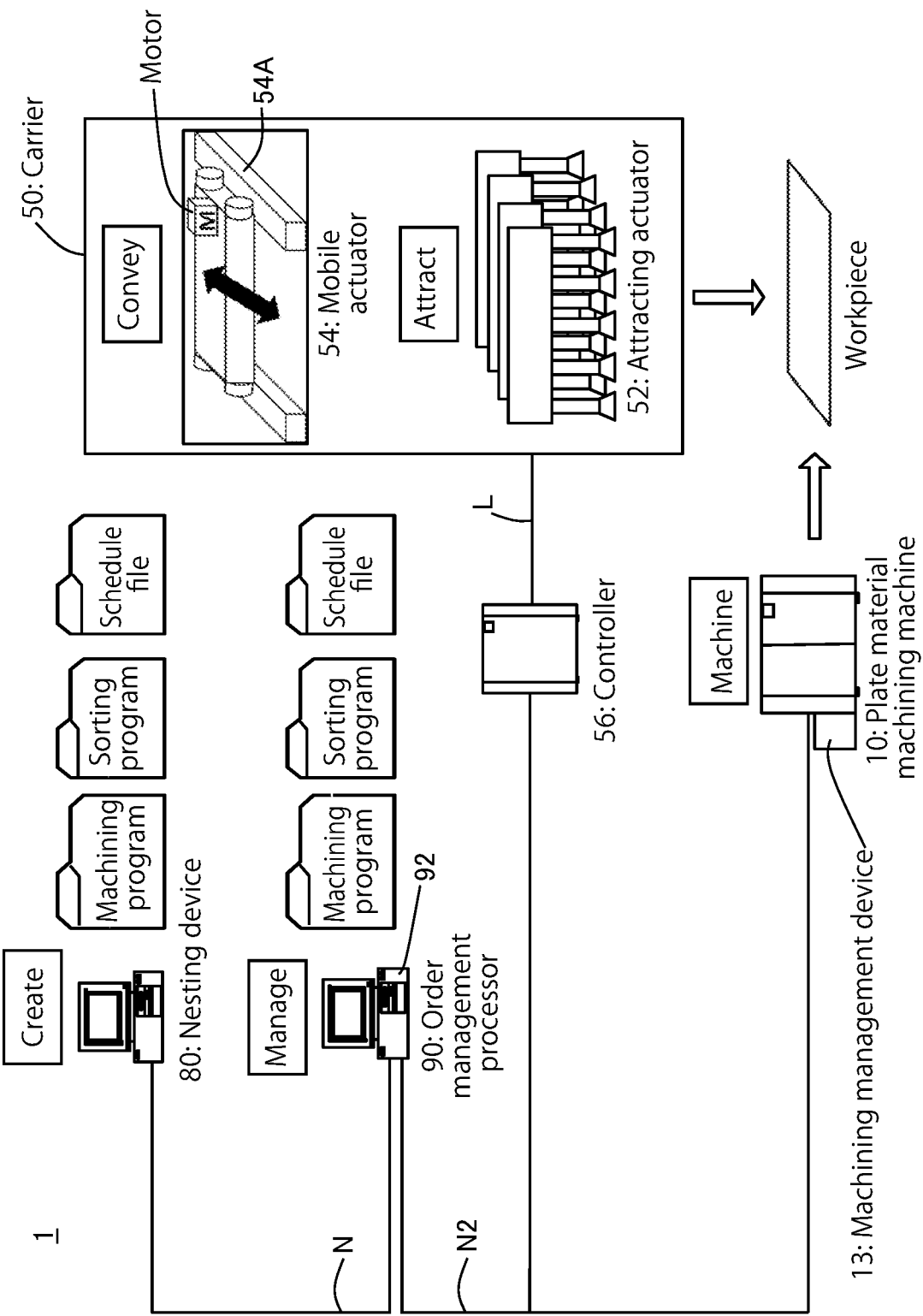
FIG. 13 shows the sheet material machining system according to the first embodiment.

An additional configuration to the sheet material machining system 1 according to the first embodiment will now be described herein with reference to FIG. 13. FIG. 13 is a functional block diagram of the sheet material machining system 1 according to the first embodiment, the functional block diagram schematically illustrating the sheet material machining system 1. The sheet material machining system 1 illustrated in FIG. 13 is added with an order management device (an order management processor) 90. The sheet material machining system 1 according to the first embodiment may include a nesting device 80.

The nesting device 80 is a device used by an operator to create machining programs, sorting programs, and schedule files. Creating a program includes assigning a numerical value to a variable in an existing program. A machining program is a program that controls the sheet material machining machine 10. For example, the machining program includes a program that controls how the machining head 11 is moved in order to cut out a plurality of products from each workpiece. A sorting program is a program that controls the carrier 50. For example, the sorting program includes a program that activates or deactivates each of the attracting portions 520 so that only a product is lifted from a machined workpiece Wd on the sorting table 20. The sorting program includes a program that controls how the mobile object 54B is moved from a vertically upward position above the sorting table 20 to a vertically upward position above the temporary placement table 30. A schedule file is a file that manages a schedule of producing a plurality of products from each un-machined workpiece Wn.

In this specification, the term "nesting" at least denotes an arrangement of products in a machined workpiece Wd. Based on a machining program created by the nesting device 80, the sheet material machining machine 10 machines an un-machined workpiece Wn so that products in the machined workpiece Wd are arranged as specified. Based on a sorting program created by the nesting device 80, the carrier 50 is able to separate and convey the products in the machined workpiece Wd from a residual material.

An operator uses the nesting device 80 to specify a plurality of products to be separate from each un-machined workpiece Wn, and to specify a layout of the plurality of products in the machined workpiece Wd. Based on the specifications by the operator, the nesting device 80 creates a machining program, a sorting program, and a schedule file. For example, to produce a plurality of products illustrated in FIG. 12, the operator uses the nesting device 80 to specify the products F1, F2, J1, J2, J3, and J4 to be separate from an un-machined workpiece Wn, and to specify an arrangement of the products (F1, F2, J1, J2, J3, and J4).

The order management device 90 receives the sorting program created by the nesting device 80. The order management device 90 may receive a machining program created by the nesting device 80. When the nesting device 80 and the order management device 90 are coupled via a network N, the order management device 90 receives a sorting program, for example, via the network N.

The order management device 90 includes an arithmetic operation device and a storage device 92. The arithmetic operation device includes a hardware processor. The hardware processor runs a sorting program stored in the storage device 92 to cause the arithmetic operation device to function as a sorting instruction unit. The arithmetic operation device (sorting instruction unit) sends to the controller 56 an attracting portion activation signal that instructs that the attracting portions are activated and/or a mobile object movement signal that instructs that the mobile object is moved. When the storage device 92 stores a schedule file, the arithmetic operation device sends, based on a schedule stored in the schedule file, the attracting portion activation signal and/or the mobile object movement signal, described above. The attracting actuator 52 included in the carrier 50 receives from the controller 56 the attracting portion activation signal to activate or deactivate, in accordance with the attracting portion activation signal, each of the attracting portions 520. The mobile actuator 54 included in the carrier 50 receives from the controller 56 the mobile object movement signal to control, in accordance with the mobile object movement signal, the mobile object 54B for its position.

In the example illustrated in FIG. 13, the order management device 90 and the controller 56 are coupled via a network N2. The controller 56 and the carrier 50 are coupled via a control signal line L.

The hardware processor of the order management device 90 may run a machining program stored in the storage device 92 to allow the arithmetic operation device to function as a machining instruction unit. In this case, the arithmetic operation device sends, based on a schedule stored in the schedule file, a sheet material machining machine control signal to the sheet material machining machine 10. In accordance with the sheet material machining machine control signal, the sheet material machining machine 10 machines an un-machined workpiece Wn. For example, in accordance with the sheet material machining machine control signal, the sheet material machining machine 10 cuts out a plurality of products from the un-machined workpiece Wn.

In the example illustrated in FIG. 13, the order management device 90 is disposed separately from the controller 56. Alternatively, the controller 56 may include the functionality of the order management device 90.

Alternatively or additionally, the sheet material machining machine 10 may include a machining management device 13. The machining management device 13 includes an arithmetic operation device and a storage device. The arithmetic operation device includes a hardware processor. The machining management device 13 receives a machining program and a schedule file from the order management device 90 via the network N2. The machining management device 13 sends, based on a schedule stored in the schedule file, a sheet material machining machine control signal to the sheet material machining machine 10. In accordance with the sheet material machining machine control signal, the sheet material machining machine 10 machines an un-machined workpiece Wn.

Example Control Using Order Management Device

Next, an example of a control using the order management device 90 will now be described herein. The storage device 92 of the order management device 90 memorizes a layout of a plurality of products in a machined workpiece Wd. The layout of the plurality of products are the layout specified by the operator using the nesting device 80. The nesting device 80 and artificial intelligence (AI) may be combined to automatically specify a layout of a plurality of products.

To produce the plurality of products illustrated in FIG. 12, the storage device 92 memorizes that the first order A includes the products (F1 and F2) and the second order B includes the products (J1, J2, J3, and J4). In other words, the storage device 92 memorizes the plurality of orders associated with the plurality of products. When the plurality of products are conveyed from the temporary placement table 30 to the discharge table 40, the order management device 90 first sends a first control signal to the controller 56 so that the plurality of attracting portions 520 attract only the first products (F1 and F2) corresponding to the first order A. After the first products (F1 and F2) are conveyed to the discharge table 40, the order management device 90 sends a second control signal to the controller 56 so that the plurality of attracting portions 520 attract only the second products (J1, J2, J3, and J4) corresponding to the second order B.

Upon receiving the above-described first control signal, the controller 56 may advantageously control the attracting actuator 52 so that the attracting actuator 52 collectively attracts all the first products (F1 and F2) that correspond to the first order A and that are placed on the temporary placement table 30. Upon receiving the above-described first control signal, the controller 56 may advantageously control the mobile actuator 54 so that the mobile actuator 54 collectively conveys all the first products to the discharge table 40.

The order management device 90 may advantageously send a control signal including a first control signal and a second control signal to the controller 56 to cause the carrier 50 to repeatedly convey products per order to the discharge table 40 so that all products corresponding to all orders are conveyed.

The control using the order management device will also be described later in detail in the description of a method for operating the sheet material machining system (in particular, thirteenth step ST13 and fourteenth step ST14).

Operation Method for Sheet Material Machining System

Figure 14A:
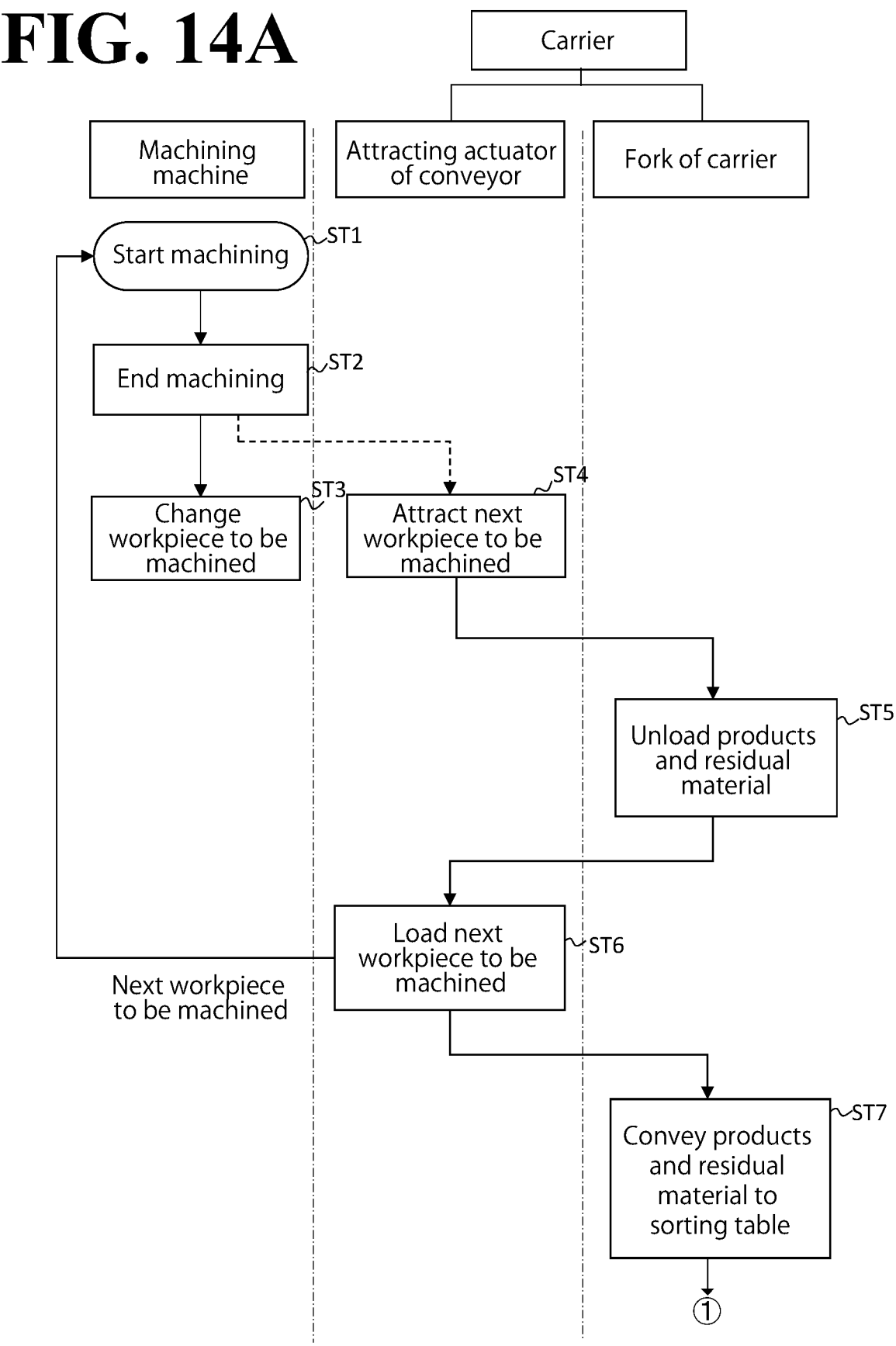
FIG. 14A is a flowchart of a method for operating the sheet material machining system according to the first embodiment or for a sheet material machining system according to a second embodiment, the flowchart illustrating an example.
Figure 14B:
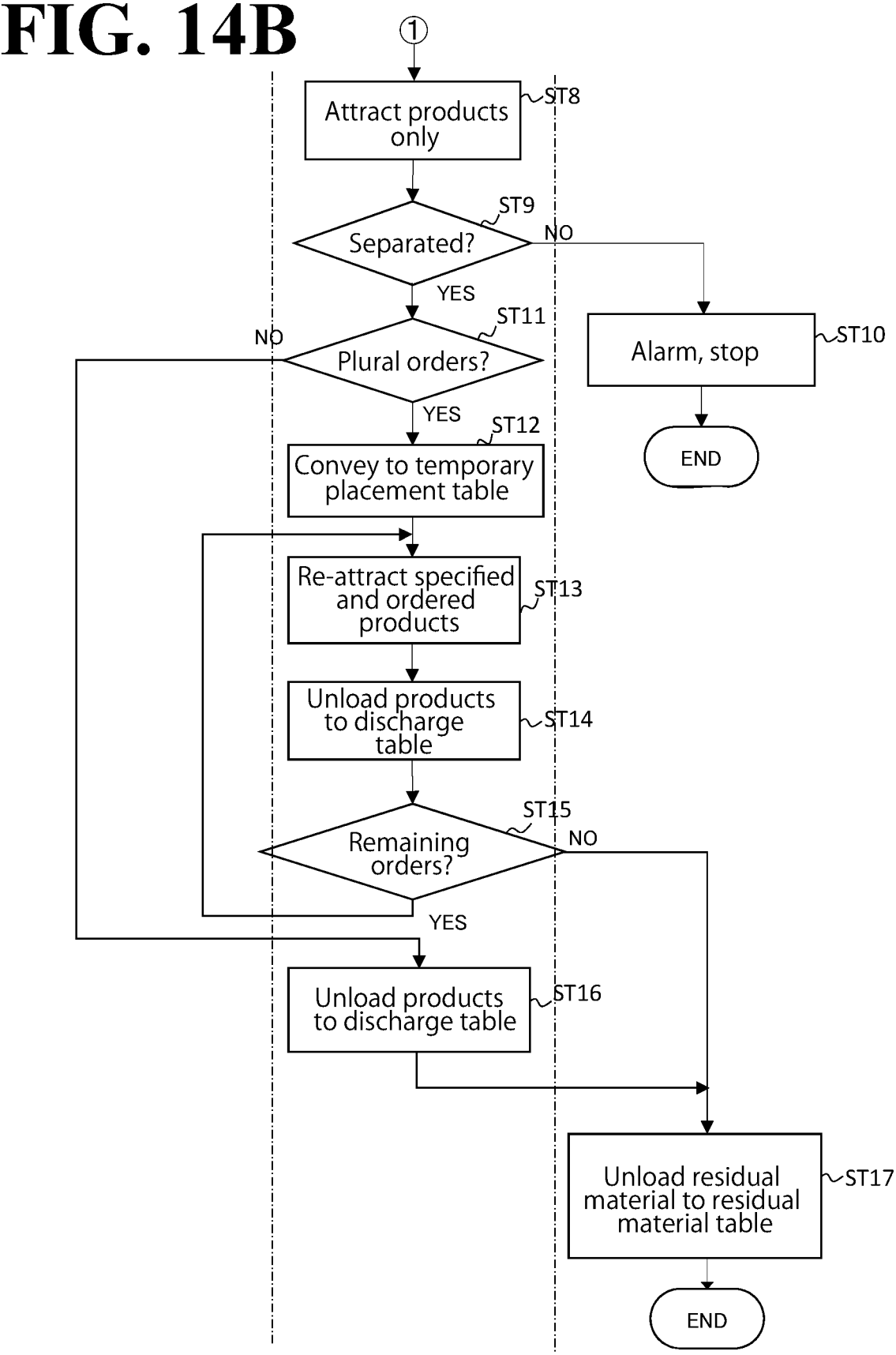
FIG. 14B is a flowchart of the method for operating the sheet material machining system according to the first embodiment, the flowchart illustrating an example.

Next, a method for operating a sheet material machining system, according to the first embodiment, will now be described herein in detail with reference to FIGS. 14A and 14B. FIGS. 14A and 14B are flowcharts of the method for operating the sheet material machining system according to the first embodiment, the flowcharts illustrating examples.

How the sheet material machining machine 10 is operated will now first be described herein. Here assumes that, before first step ST1, an un-machined, first workpiece is loaded into the sheet material machining machine 10.

In first step ST1, the sheet material machining machine 10 begins machining on the first workpiece (un-machined workpiece Wn). Machining the first workpiece refers to cutting out a plurality of products from the first workpiece, for example. Machining on the first workpiece is cutting the first workpiece with a laser beam, for example.

In second step ST2, the sheet material machining machine 10 ends the machining on the first workpiece. For example, in accordance with a sheet material machining machine control signal, the sheet material machining machine 10 cuts out all scheduled products from the first workpiece. Upon all the scheduled products have been cut out, the machining on the first workpiece is completed.

Third step ST3 is a step in which a machining-target workpiece is switched. Third step ST3 includes, for example, a step in which the machined first workpiece is unloaded from the workpiece delivery table 12 and a step in which a second workpiece placed on the workpiece delivery table 12 (that is, un-machined, next workpiece to be machined) is transferred into the sheet material machining machine 10. The step in which the first workpiece is unloaded from the workpiece delivery table 12 is executed by the carrier 50, while the step in which the second workpiece is transferred into the sheet material machining machine 10 is executed by the workpiece conveyance mechanism included in the sheet material machining machine 10.

First step ST1 to third step ST3 are repeatedly executed until there is no workpiece to be machined. First step ST1 to third step ST3 are executed by operating the sheet material machining machine 10 in accordance with a sheet material machining machine control signal sent from the order management device 90 or the machining management device 13, described above.

Next, how the carrier 50 is operated will now be described herein. Operating the carrier 50 includes operating the attracting actuator 52 of the carrier 50, operating the fork 58 of the carrier, and operating the mobile object 54B of the carrier 50.

In fourth step ST4, the attracting actuator 52 attracts the second workpiece (next workpiece to be machined) on the workpiece loading table 62. The attracting may be performed by activating (turning on) the plurality of attracting portions 520 that correspond to a surface shape of the second workpiece, while deactivating (turning off) the plurality of attracting portions that do not correspond to the surface shape of the second workpiece. Alternatively, the attracting may be performed by activating (turning on) all the attracting portions 520 included in the attracting actuator 52.

Fourth step ST4 may start upon the first workpiece has been machined (for example, upon the controller 56 receives a first workpiece machining completion signal), which is regarded as a trigger. Fourth step ST4 may start before third step ST3 starts, or while third step ST3 is being executed.

In fourth step ST4, the attracting actuator 52 first moves together with the mobile object 54B to a position above the workpiece loading table 62 of the workpiece stocker 60. After that, the attracting actuator 52 lowers to attract the second workpiece on the workpiece loading table 62. The attracting actuator 52 then raises, and the second workpiece is attracted and held by the attracting actuator 52.

In fifth step ST5, the fork 58 of the carrier 50 lifts the machined first workpiece that includes a plurality of products and a residual material G from the sheet material machining machine 10 (specifically, workpiece delivery table 12). It is necessary that the first workpiece be lifted (that is, unloaded) in fifth step ST5 after the first workpiece be transferred by the carrier 50 to the picking-up position in third step ST3, described above.

Fifth step ST5 will now more specifically be described herein. In fifth step ST5, the fork 58 first moves to a position under the first workpiece. The movement is achieved by causing the mobile object 54B to move in direction Y and causing the lifting actuators 59 to lower the fork 58. The fork 58 enters into the grooves 14 on the workpiece delivery table 12, and, as a result, the fork 58 lies under the first workpiece. Next, the lifting actuators 59 lift the fork 58. As the lifting proceeds, the fork 58 scoops the first workpiece.

Immediately after the first workpiece is scooped by the fork 58, the first workpiece is held by the fork 58 of the carrier, and the second workpiece is held by the attracting actuator 52 of the carrier. In other words, the carrier 50 (more specifically, the mobile object 54B of the carrier 50) temporarily and simultaneously holds both the first workpiece and the second workpiece.

In sixth step ST6, when the attracting actuator 52 releases the attracted second workpiece, the second workpiece is placed on the sheet material machining machine 10. More specifically, the second workpiece is placed on the workpiece delivery table 12 of the sheet material machining machine 10.

Sixth step ST6 includes a step in which the attracting actuator 52 attracting and holding the second workpiece is caused to move to a position above the sheet material machining machine 10 (more specifically, the workpiece delivery table 12), a step in which the attracting actuator 52 is lowered by the lifting actuators 57, and a step in which the attracting portions 520 are each deactivated (attracting is released). When the attracting portions 520 are each deactivated, the second workpiece moves from the attracting actuator 52 to the workpiece delivery table 12.

After sixth step ST6 is executed, that is, after the second workpiece is loaded onto the workpiece delivery table 12, the sheet material machining machine 10 partially executes third step ST3 to transfer the second workpiece into the sheet material machining machine 10.

After sixth step ST6 is executed, the attracting actuator 52 also returns to an original position (home position), that is, an upper position. After sixth step ST6 is executed, the fork 58 of the carrier 50 holds the first workpiece that includes the plurality of products and the residual material. On the other hand, the attracting actuator 52 of the carrier 50 holds nothing.

In seventh step ST7, the carrier 50 conveys fully the first workpiece that includes the plurality of products and the residual material and that is supported by the fork 58 to the sorting table 20.

Seventh step ST7 will now more specifically be described herein. In seventh step ST7, the fork 58 of the carrier 50 first moves to the vertically upward position above the sorting table 20. The movement is performed by causing the mobile object 54B to move. Next, the fork 58 holding the first workpiece is lowered by the lifting actuators 59. Upon the fork 58 enters into the grooves 23 on the sorting table 20, the first workpiece on the fork is placed on the sorting table 20.

Seventh step ST7 is executed with a layout of the first workpiece kept maintained, that is, with positions of the plurality of products relative to the residual material G in the first workpiece kept maintained. After seventh step ST7 ends, the fork 58 returns to the original position (home position), that is, the upper position.

In eighth step ST8, the attracting actuator 52 of the carrier 50 attracts only the products so that the residual material G is left behind on the sorting table 20. The attracting may advantageously be executed so that all the products in the first workpiece are attracted.

In ninth step ST9, it is determined whether all the products in the first workpiece are separate from the residual material G. When it is determined that all the products are separate from the residual material G (ninth step ST9: YES), that is, when it is determined that the first workpiece (machined workpiece Wd) is not an unacceptable workpiece, step ST11 proceeds. If it is determined that at least one of all the products is not separate from the residual material G (ninth step ST9: NO), that is, if it is determined that the first workpiece (machined workpiece Wd) is an unacceptable workpiece, step ST10 proceeds. Whether all the products are separate from the residual material G is determined by a determination unit (determination processor). The determination unit is a computer, such as the controller 56 or the order management device 90. In accordance with a signal received from an image sensor or a weight sensor, for example, the computer, such as the controller 56 or the order management device 90, may determine whether all the products are separate from the residual material G.

Tenth step ST10 will now be described herein. If it is determined that at least one of all the products is not separate from the residual material G, it is determined that the workpiece, which includes the product that is not separate, is an unacceptable workpiece that has not yet fully been cut, for example. If there is an unacceptable workpiece, that is, if the determination unit determines that at least one of all the products is not separate from the residual material G, the sheet material machining system 1 issues an alarm and stops its operation. The alarm may be a warning sound or a warning indication shown on a display. Upon the alarm is issued, the operator manually removes the unacceptable workpiece. After that, the sheet material machining system 1 resumes its operation.

In eleventh step ST11, it is determined if the first workpiece includes products corresponding to a single order or a plurality of orders. The determination is performed by the order management device 90, for example. When the first workpiece includes the products corresponding to the single order (eleventh step: NO), sixteenth step ST16 proceeds. When the first workpiece includes the products corresponding to the plurality of orders, twelfth step ST12 proceeds.

Sixteenth step ST16 will now be described herein. When it is determined that the first workpiece includes the products corresponding to the single order, the carrier 50 collectively unloads all the products included in the first workpiece to the discharge table 40. For example, the attracting actuator 52 of the carrier 50 attracts all the products included in the first workpiece. The mobile object 54B of the carrier 50 conveys all the products included in the first workpiece so that the attracting actuator 52 lies above the discharge table 40. After that, when the attracting actuator 52 releases the attracted products, for example, when all the attracting portions 520 are each deactivated, all the products included in the first workpiece move from the attracting actuator 52 to the discharge table 40. After that, the products on the discharge table 40 are conveyed to a predetermined location, such as a warehouse. After sixteenth step ST16 ends, seventeenth step ST17 proceeds.

Twelfth step ST12 will now be described herein. When it is determined that the first workpiece includes products corresponding to a plurality of orders, for example, the products corresponding to the first order A and the products corresponding to the second order B, the carrier 50 collectively conveys all the products included in the first workpiece to the temporary placement table 30. For example, the attracting actuator 52 of the carrier 50 attracts all the products included in the first workpiece, and the mobile object 54B of the carrier 50 conveys all the products included in the first workpiece so that the attracting actuator 52 lies above the temporary placement table 30. After that, when the attracting actuator 52 releases the attracted products, for example, when all the attracting portions 520 are each deactivated, all the products included in the first workpiece move from the attracting actuator 52 to the temporary placement table 30. The operation in which the carrier 50 collectively conveys all the products included in the first workpiece to the temporary placement table 30 is performed in accordance with a control signal sent from the order management device 90 to the controller 56.

In thirteenth step ST13 and fourteenth step ST14, products corresponding to specified orders are conveyed from the temporary placement table 30 to the discharge table 40.

Thirteenth step ST13 will now specifically be described herein. The attracting actuator 52 of the carrier 50 attracts only the products corresponding to the first order A (that is, the products belonging to the first group). At this time, the attracting actuator does not attract products that do not correspond to the first order A (that is, products that do not belong to the first group). In order to allow the attracting actuator 52 to attract only the products corresponding to the first order A, the controller 56 separately activates or deactivates each of the plurality of attracting portions 520. In other words, the controller 56 activates (turns on) the attracting portions 520 lying at positions corresponding to the products corresponding to the first order A, while deactivates (turns off) the attracting portions 520 lying at other positions. The operation in which the attracting actuator 52 attracts only the products corresponding to the first order A is performed in accordance with a first control signal sent from the order management device 90 to the controller 56.

Fourteenth step ST14 will now specifically be described herein. The mobile object 54B of the carrier 50 conveys the products corresponding to the first order A so that the attracting actuator 52 lies above the discharge table 40. After that, when the attracting actuator 52 releases the attracted products, for example, when all the attracting portions 520 are each deactivated, the products corresponding to the first order A move from the attracting actuator 52 to the discharge table 40. After that, the products on the discharge table 40 are conveyed to a predetermined location, such as a warehouse.

In thirteenth step ST13 and fourteenth step ST14, products corresponding to a specified order may advantageously be collectively conveyed at a time. For example, assume that the products placed on the temporary placement table 30 include the plurality of products corresponding to the first order A. In this case, in accordance with the above-described first control signal, the attracting actuator 52 collectively attracts all the products corresponding to the first order A. The carrier 50 then collectively conveys all the products corresponding to the first order A to the discharge table 40.

Alternatively, in thirteenth step ST13 and fourteenth step ST14, products corresponding to a specified order may be conveyed separately at a plurality of times.

In fifteenth step ST15, it is determined whether there is a product corresponding to a remaining order on the temporary placement table 30. The determination is performed by the order management device 90, for example. If there is a product corresponding to another order on the temporary placement table 30, thirteenth step ST13 resumes. When there is no product corresponding to other orders on the temporary placement table 30, seventeenth step ST17 proceeds.

For example, assume that, in thirteenth step ST13 and fourteenth step ST14, after the carrier 50 has conveyed the products corresponding to the first order A, there are the products corresponding to the second order B on the temporary placement table 30. In this case, in fifteenth step ST15, it is determined that there is a product corresponding to another order (remaining order) on the temporary placement table 30. Thirteenth step ST13 thus resumes. In thirteenth step ST13, the attracting actuator 52 of the carrier 50 attracts only the products corresponding to the second order B. In order to allow the attracting actuator 52 to attract only the products corresponding to the second order B, the controller 56 separately activates or deactivates each of the plurality of attracting portions 520. In other words, the controller 56 activates (turns on) the attracting portions 520 lying at positions corresponding to the products corresponding to the second order B, while deactivates (turns off) the attracting portions 520 lying at other positions. The operation in which the attracting actuator 52 attracts only the products corresponding to the second order B is performed in accordance with a second control signal sent from the order management device 90 to the controller 56.

Next, in fourteenth step ST14, the mobile object 54B of the carrier 50 conveys the products corresponding to the second order B so that the attracting actuator 52 lies above the discharge table 40. After that, when the attracting actuator 52 releases the attracted products, for example, when all the attracting portions 520 are each deactivated, the products belonging to the second order B move from the attracting actuator 52 to the discharge table 40. After that, the products on the discharge table 40 are conveyed to a predetermined location, such as a warehouse.

Here then assumes that, in thirteenth step ST13 and fourteenth step ST14, after the carrier 50 has conveyed the products corresponding to the second order, there are products corresponding to another order on the temporary placement table 30. In this case, thirteenth step ST13 again resumes. In other words, the carrier 50 repeatedly conveys products per order from the temporary placement table 30 to the discharge table 40 so that all products corresponding to all orders are conveyed. When there is no product on the temporary placement table 30, seventeenth step ST17 proceeds.

In seventeenth step ST17, the residual material G on the sorting table 20 is conveyed from the sorting table 20 to the residual material table 70. The conveyance is executed by using the fork 58 of the carrier 50, for example.

After seventeenth step ST17 is executed, and when there is a next workpiece to be machined, the carrier 50 again executes fourth step ST4. When there is no next workpiece to be machined, the process ends.

Fourth step ST1 to seventeenth step ST17 are executed by causing the carrier 50 to operate in accordance with an attracting portion activation signal and a mobile object movement signal sent from the order management device 90, described above.

Second Embodiment

Figure 16:
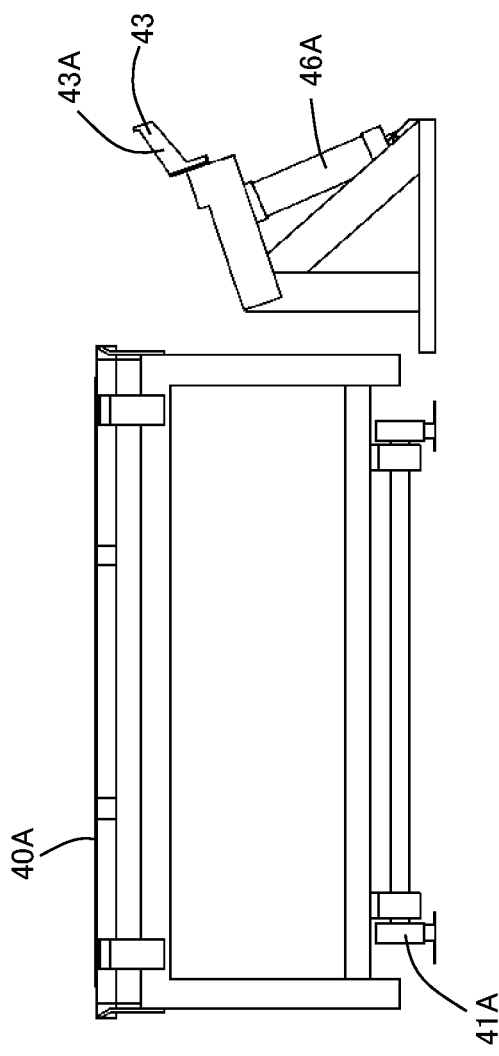
FIG. 16 is a schematic front view of the discharge table and the unacceptable workpiece withdrawal device according to the second embodiment, the schematic front view illustrating an example (in FIG. 16, an unacceptable workpiece stopper is disengaged)
Figure 17:
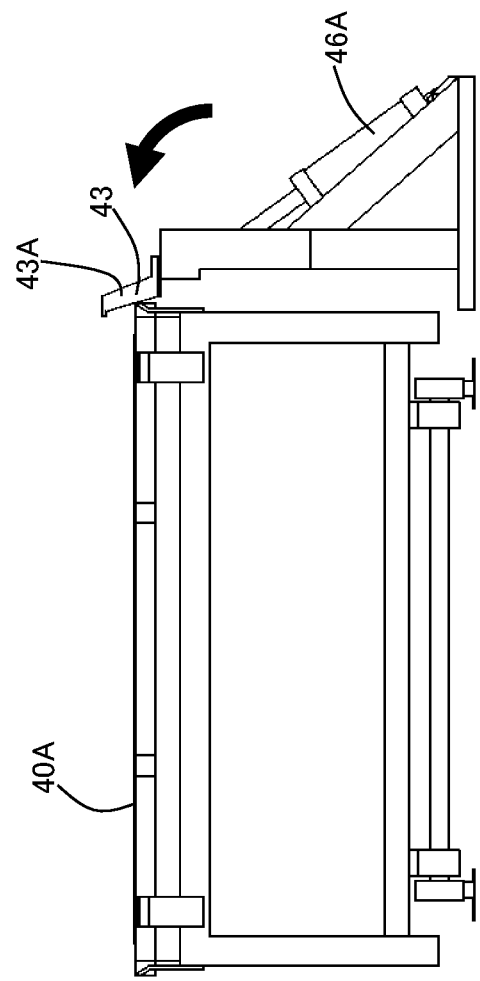
FIG. 17 is a schematic front view of the discharge table and the unacceptable workpiece withdrawal device according to the second embodiment, the schematic front view illustrating an example (in FIG. 17, the unacceptable workpiece stopper is engaged).

A sheet material machining system according to a second embodiment will now be described herein with reference to FIGS. 15 to 17. The sheet material machining system according to the second embodiment differs from the sheet material machining system according to the first embodiment in terms of an unacceptable workpiece withdrawal device 43 disposed adjacent to the discharge table 40A. For other points, the sheet material machining system according to the second embodiment is identical to the sheet material machining system according to the first embodiment. The second embodiment is thus described by focusing on the discharge table 40A and the unacceptable workpiece withdrawal device 43. Other configurations included in the sheet material machining system will not be repeatedly elaborated upon here.

Figure 15:
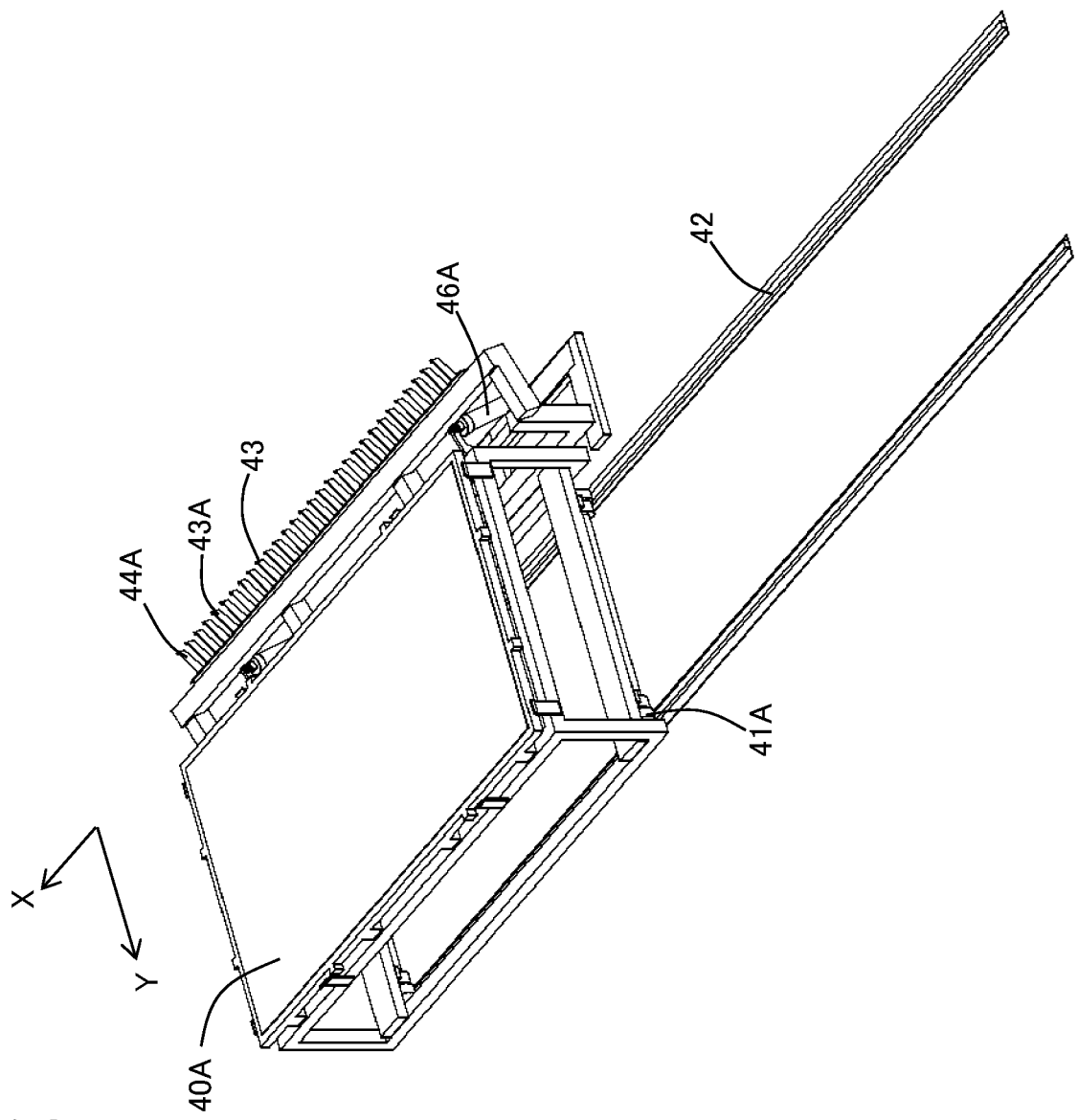
FIG. 15 is a schematic perspective view of a discharge table and an unacceptable workpiece withdrawal device according to the second embodiment, the schematic perspective view illustrating an example.

FIG. 15 is a schematic perspective view of the discharge table 40A and the unacceptable workpiece withdrawal device 43, the schematic perspective view illustrating an example. FIGS. 16 and 17 are schematic front views of the discharge table 40A and the unacceptable workpiece withdrawal device 43, the schematic front views illustrating examples. FIG. 16 illustrates that the unacceptable workpiece stopper 43A configured to withdraw an unacceptable workpiece from the mobile object 54B onto the discharge table 40A is disengaged. FIG. 17 illustrates that the unacceptable workpiece stopper 43A is engaged.

With reference to FIG. 15, the sheet material machining system includes the unacceptable workpiece withdrawal device 43 placed at a position adjacent to the discharge table 40A. The unacceptable workpiece withdrawal device 43 may include an unacceptable workpiece stopper 43A and an actuator 46A configured to engage or disengage the unacceptable workpiece stopper 43A. In the example illustrated in FIG. 15, the discharge table 40A and the unacceptable workpiece withdrawal device 43 are separate from each other. Alternatively, the discharge table 40A and the unacceptable workpiece withdrawal device 43 may be combined to each other. For example, the unacceptable workpiece stopper 43A may be disposed on an upper face of the discharge table 40A.

In the example illustrated in FIG. 15, the unacceptable workpiece stopper 43A includes a plurality of protrusions 44A. In this case, when the fork 58 passes through gaps between the protrusions 44A and move back (in the example illustrated in FIG. 15, moves in a direction opposite to direction Y), the unacceptable workpiece stopper 43A withdraws an unacceptable workpiece. When there is an unacceptable workpiece to be withdrawn, the actuator 46A engages the unacceptable workpiece stopper 43A as illustrated in FIG. 17.

In the example illustrated in FIG. 15, the discharge table 40A includes wheels 41A. The discharge table 40A is movable on the rails 42. The discharge table 40A moves in a direction that is parallel to direction X, for example. When the discharge table 40A moves on the rails, the unacceptable workpiece stopper 43A may advantageously be disengaged (that is, evacuated) illustrated in FIG. 16. With the unacceptable workpiece stopper 43A being disengaged, the discharge table 40A can freely move without being hindered by the unacceptable workpiece stopper 43A. When the unacceptable workpiece stopper 43A is attached on the upper face of the discharge table 40A, the discharge table 40A can freely move without being hindered by the unacceptable workpiece stopper 43A. In this case, the actuator 46A configured to activate or deactivate the unacceptable workpiece stopper 43A may be omitted.

In the second embodiment, the discharge table 40 according to the first embodiment is replaced with the discharge table 40A. The discharge table 40A itself and the discharge table 40 according to the first embodiment may have the same shape and structure. In the second embodiment, the discharge table 40A may be disposed in addition to the discharge table 40 according to the first embodiment. In other words, in the second embodiment, the discharge table 40 from which products are unloaded and the discharge table 40A from which unacceptable workpieces are unloaded may differ from each other. In this case, the discharge table 40A functions as a second discharge table that is distinct from the discharge table 40. The second discharge table may advantageously be disposed under a route through which the mobile object 54B of the carrier 50 moves. The second discharge table is disposed on a straight line defined by connecting the sorting table 20 and the temporary placement table 30, for example. The second discharge table may be disposed between the residual material table 70 and the discharge table 40, between the discharge table 40 and the temporary placement table 30, between the temporary placement table 30 and the sorting table 20, between the sorting table 20 and the sheet material machining machine 10, or between the sheet material machining machine 10 and the workpiece stocker 60.

Alternatively, the second discharge table may be disposed downstream from the sorting table 20, the temporary placement table 30, the discharge table 40, and the residual material table 70, that is, distant from the sheet material machining machine 10.

Operation Method for Sheet Material Machining System

Figure 14C:
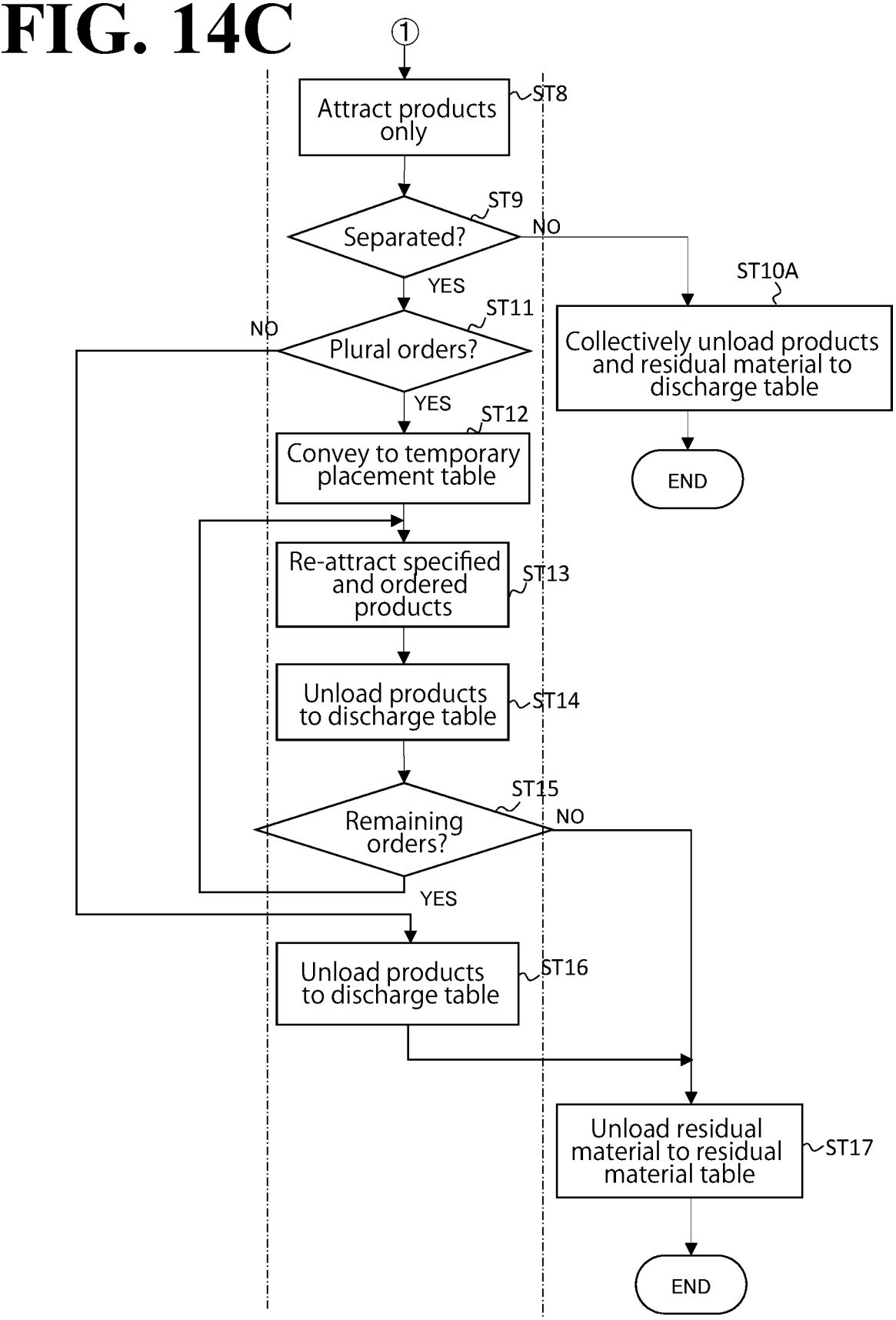
FIG. 14C is a flowchart of the method for operating the sheet material machining system according to the second embodiment, the flowchart illustrating an example.

Next, a method for operating the sheet material machining system according to the second embodiment, will now be described herein with reference to FIGS. 14A and 14C. Tenth step ST10A in the method for operating the sheet material machining system according to the second embodiment, differs in content from tenth step ST10 in the method for operating the sheet material machining system according to the first embodiment. For other points, the method for operating the sheet material machining system according to the second embodiment, is identical to the method for operating the sheet material machining system according to the first embodiment. Tenth step ST10A will now be described herein in detail. Other steps will not be repeatedly elaborated upon here.

Tenth step ST10A will now be described herein. If it is determined that at least one of all the products is not separate from the residual material G, it is determined that the workpiece, which includes the product that is not separate, is an unacceptable workpiece that has not yet fully been cut, for example. The unacceptable workpiece may advantageously be unloaded by the carrier 50 to a predetermined location. The predetermined location is the discharge table 40A illustrated in FIGS. 15 to 17, for example.

Tenth step ST10A will now further specifically be described herein. The fork 58 of the carrier 50 scoops from the sorting table 20 the unacceptable workpiece (the unacceptable workpiece includes a residual material, products that are not separate from the residual material, and products that are separate from the residual material). The unacceptable workpiece supported by the fork 58 is placed on the discharge table 40A by using the mobile object 54B and the fork 58. The unacceptable workpiece withdrawal device 43, described above, is used to put the unacceptable workpiece in place on the discharge table 40A.

When the sheet material machining system according to the embodiment includes the discharge table 40A (or a second discharge table that is distinct from the discharge table 40), the sheet material machining system is not required to fully stop its operation (for example, operations of the sheet material machining machine 10 and the carrier 50) even though an unacceptable workpiece is found. In other words, the unacceptable workpiece is unloaded from the sheet material machining system via the discharge table 40A or the second discharge table, and thus does not hinder the carrier 50 for its operation. The sheet material machining machine 10 is thus able to continue machining on a next workpiece to be machined (second workpiece) (first step ST1 to third step ST3), and the carrier 50 is able to attract and convey a next un-machined workpiece Wn (third workpiece) (for example, fourth step ST4 to sixth step ST6), leading to higher efficiency in conveying products.

The present invention is not limited to the above-described embodiments. Within the scope of the present invention, the above-described embodiments can be freely combined, as well as any components in the embodiments can be modified or omitted.

What is claimed is:

1. A sheet material machining system comprising:
   a sheet material machining machine configured to machine a workpiece to produce a machined workpiece that includes a plurality of products and a residual material;
   a sorting table on which the machined workpiece is configured to be placed;
   a temporary placement table on which the plurality of products are configured to be placed;

a discharge table on which at least one product among the plurality of products are configured to be placed;

a carrier comprising:
- an attracting actuator comprising a plurality of attracting portions; and
- a mobile actuator to move the attracting actuator between the sorting table and the temporary placement table, and between the temporary placement table and the discharge table;

a controller configured to activate or deactivate each of the plurality of attracting portions individually; and an order management processor configured to control the carrier and comprising a storage configured to memorize a layout of the plurality of products in the workpiece, the plurality of products being associated with an attracting order, wherein the order management processor is configured to send a first control signal to the controller so that the plurality of attracting portions attract at least one first product among the plurality of products according to the attracting order, and wherein the order management processor is configured to send a second control signal to the controller so that, after the at least one first product is conveyed to the discharge table, the plurality of attracting portions attract at least one second product among the plurality of products according to the attracting order.

2. The sheet material machining system according to claim 1,
wherein the attracting actuator is configured to attract all of the plurality of products placed on the sorting table, and
wherein the mobile actuator is configured to convey all of the plurality of products attracted by the attracting actuator from the sorting table to the temporary placement table at once.

3. The sheet material machining system according to claim 2,
wherein the temporary placement table is disposed between the sorting table and the discharge table.

4. The sheet material machining system according to claim 2,
wherein the carrier comprises a fork, and
wherein the sorting table comprises a plurality of grooves to accept the fork.

5. The sheet material machining system according to claim 1,
wherein the attracting actuator is configured to attract all of the at least one first product at once in accordance with the first control signal, and
wherein the mobile actuator is configured to convey the all of the at least one first product from the temporary placement table to the discharge table at once.

6. The sheet material machining system according to claim 5,
wherein the carrier is configured to convey the plurality of products according to the attracting order.

7. The sheet material machining system according to claim 6,
wherein the temporary placement table is disposed between the sorting table and the discharge table.

8. The sheet material machining system according to claim 6,
wherein the carrier comprises a fork, and
wherein the sorting table comprises a plurality of grooves to accept the fork.

9. The sheet material machining system according to claim 5,
wherein the temporary placement table is disposed between the sorting table and the discharge table.

10. The sheet material machining system according to claim 5,
wherein the carrier comprises a fork, and
wherein the sorting table comprises a plurality of grooves to accept the fork.

11. The sheet material machining system according to claim 1,
wherein the temporary placement table is disposed between the sorting table and the discharge table.

12. The sheet material machining system according to claim 11,
wherein the carrier comprises a fork, and
wherein the sorting table comprises a plurality of grooves to accept the fork.

13. The sheet material machining system according to claim 1,
wherein the carrier comprises a fork, and
wherein the sorting table comprises a plurality of grooves to accept the fork.

14. The sheet material machining system according to claim 13,
wherein the sorting table comprises a plurality of projections that come into line contact with the machined workpiece when the machined workpiece is placed on the sorting table.

15. The sheet material machining system according to claim 13, further comprising:
- a determination processor configured to determine whether the machined workpiece is an unacceptable workpiece; and
- an unacceptable workpiece withdrawal device configured to withdraw the unacceptable workpiece onto the discharge table.

16. The sheet material machining system according to claim 1,
wherein the temporary placement table has an upper face which includes a flat surface such that the flat surface contacts an entire surface of the at least one product when the at least one product among the plurality of products is placed on the temporary placement table.

17. The sheet material machining system according to claim 1,
wherein the plurality of attracting portions are disposed so that tip surfaces of the plurality of attracting portions are flush with each other.

* * * * *